(12) United States Patent
Tanizawa et al.

(10) Patent No.: US 8,149,910 B2
(45) Date of Patent: Apr. 3, 2012

(54) IMAGE ENCODING/IMAGE DECODING METHOD AND IMAGE ENCODING/IMAGE DECODING APPARATUS

(75) Inventors: Akiyuki Tanizawa, Tokyo (JP); Takeshi Chujoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1526 days.

(21) Appl. No.: 11/564,641

(22) Filed: Nov. 29, 2006

(65) Prior Publication Data

US 2007/0121731 A1    May 31, 2007

(30) Foreign Application Priority Data

Nov. 30, 2005    (JP) .................................. 2005-347121

(51) Int. Cl.
*H04N 7/12* (2006.01)
(52) U.S. Cl. ............................. 375/240.12; 375/240.27
(58) Field of Classification Search ............. 375/240.12, 375/240.03, 240.24, 240.27; 348/241
See application file for complete search history.

(56) References Cited

U.S. PATENT DOCUMENTS

| 2005/0231616 A1* | 10/2005 | Iwai et al. ...................... 348/241 |
| 2005/0249277 A1* | 11/2005 | Ratakonda et al. ....... 375/240.03 |
| 2006/0072676 A1* | 4/2006 | Gomila ..................... 375/240.27 |

FOREIGN PATENT DOCUMENTS

| JP | 2-143679 | 6/1990 |
| JP | 6-181523 | 6/1994 |
| JP | 2005-159947 | 6/2005 |
| JP | 2005-198310 | 7/2005 |
| JP | 2005-318497 | 11/2005 |

OTHER PUBLICATIONS

Greg Conklin, "The Experiment," ITU- Telecommunications Standardization Sector, Study Group 16 Question 6, VCEG-N54, Sep. 5, 2001, 6 pages.
Office Action issued on Jan. 14, 2011 in Canada Application No. 2,631,336.

* cited by examiner

*Primary Examiner* — Gims Philippe
(74) *Attorney, Agent, or Firm* — Oblon, Spivak, McClelland, Maier & Neustadt, L.L.P.

(57) ABSTRACT

An image coding method includes dividing an input picture into a plurality of pixel block signals, performing intra prediction for extrapolating or interpolating a prediction pixel using reference pixels changed in number according to a distance between the prediction pixel and a reference pixel in plural prediction modes each representing a prediction direction, generating a predictive image signal by extrapolating or interpolating the prediction pixel, calculating a prediction error signal from the pixel block signal and the predictive image signal, selecting one prediction mode of the plural prediction modes using the prediction error signal, and performing entropy-coding using the prediction error signal based on the selected prediction mode.

13 Claims, 21 Drawing Sheets

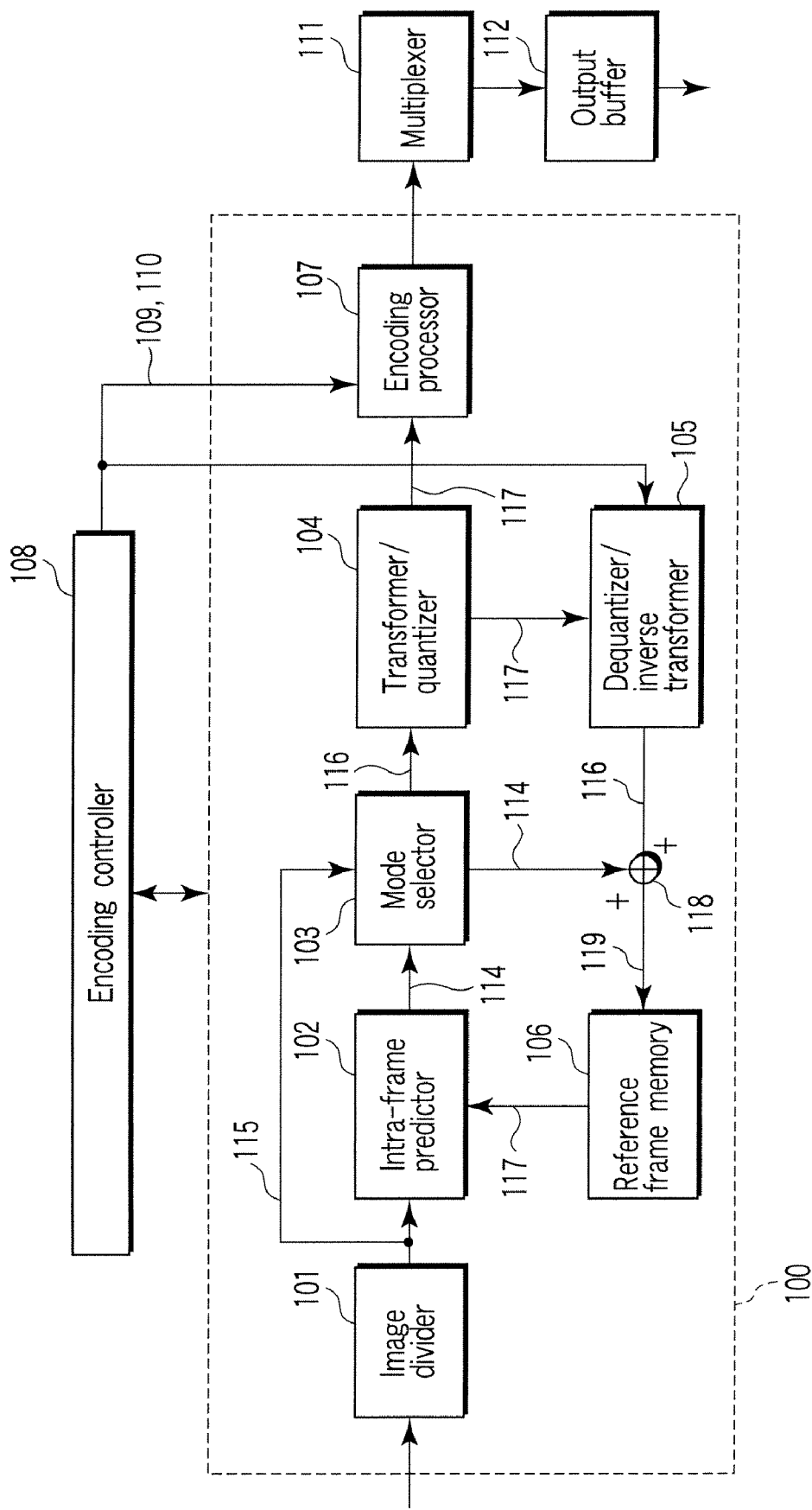
F I G. 1

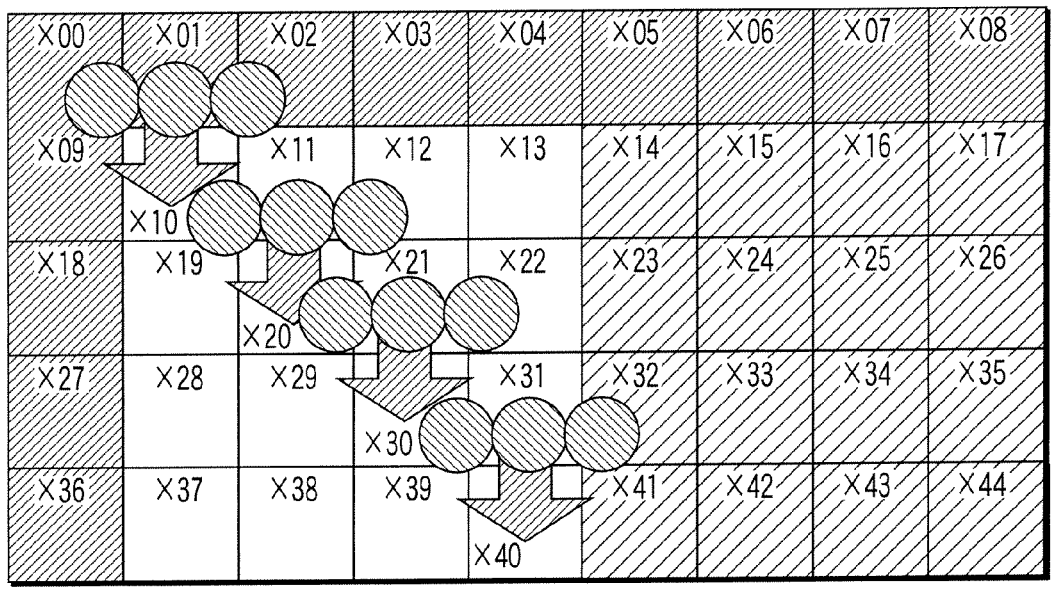

FIG. 6C

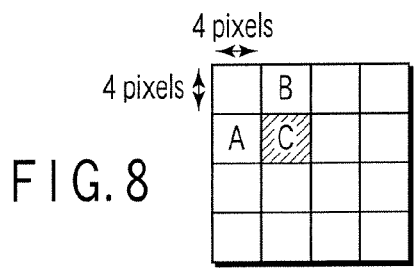

FIG. 8

| Mode number | Mode name | |
|---|---|---|
| | Directional prediction | Pixel adaptive prediction |
| 0 | Vertical prediction | Pixel adaptive vertical prediction |
| 1 | Horizontal prediction | Pixel adaptive horizontal prediction |
| 2 | DC prediction | Pixel adaptive adjacent prediction |
| 3 | Diagonal-down-left prediction | Pixel adaptive diagonal-down-left prediction |
| 4 | Diagonal-down-right prediction | Pixel adaptive diagonal-down-right prediction |
| 5 | Vertical-right prediction | Pixel adaptive vertical-right prediction |
| 6 | Horizontal-down prediction | Pixel adaptive horizontal-down prediction |
| 7 | Vertical-left prediction | Pixel adaptive vertical-left prediction |
| 8 | Horizontal-up prediction | Pixel adaptive horizontal-up prediction |

FIG. 9

| Distance with respect to reference pixel | Number of using reference pixels | Coefficient 1 | Coefficient 2 | Coefficient 3 | Coefficient 4 | Coefficient 5 | Coefficient 6 | Coefficient 7 | Coefficient 8 | Coefficient 9 | Divisor |
|---|---|---|---|---|---|---|---|---|---|---|---|
| 1 | 3 | 1 | 2 | 1 | N/A | N/A | N/A | N/A | N/A | N/A | 4 |
| 2 | 5 | 1 | 4 | 6 | 4 | 1 | N/A | N/A | N/A | N/A | 16 |
| 3 | 7 | 1 | 6 | 15 | 20 | 15 | 6 | 1 | N/A | N/A | 64 |
| 4 | 9 | 1 | 8 | 28 | 56 | 70 | 56 | 28 | 8 | 1 | 256 |

FIG. 7

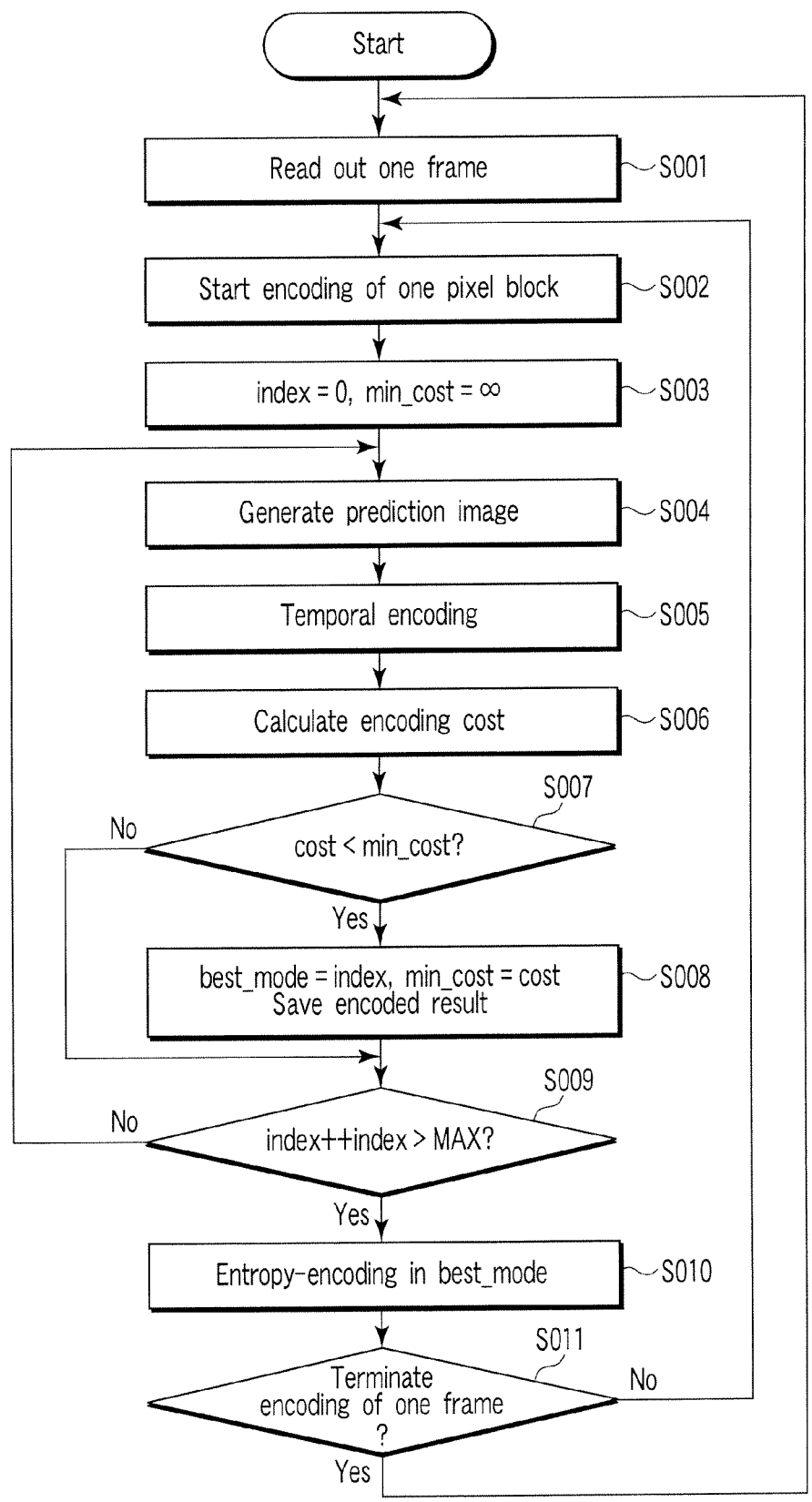
F I G. 12

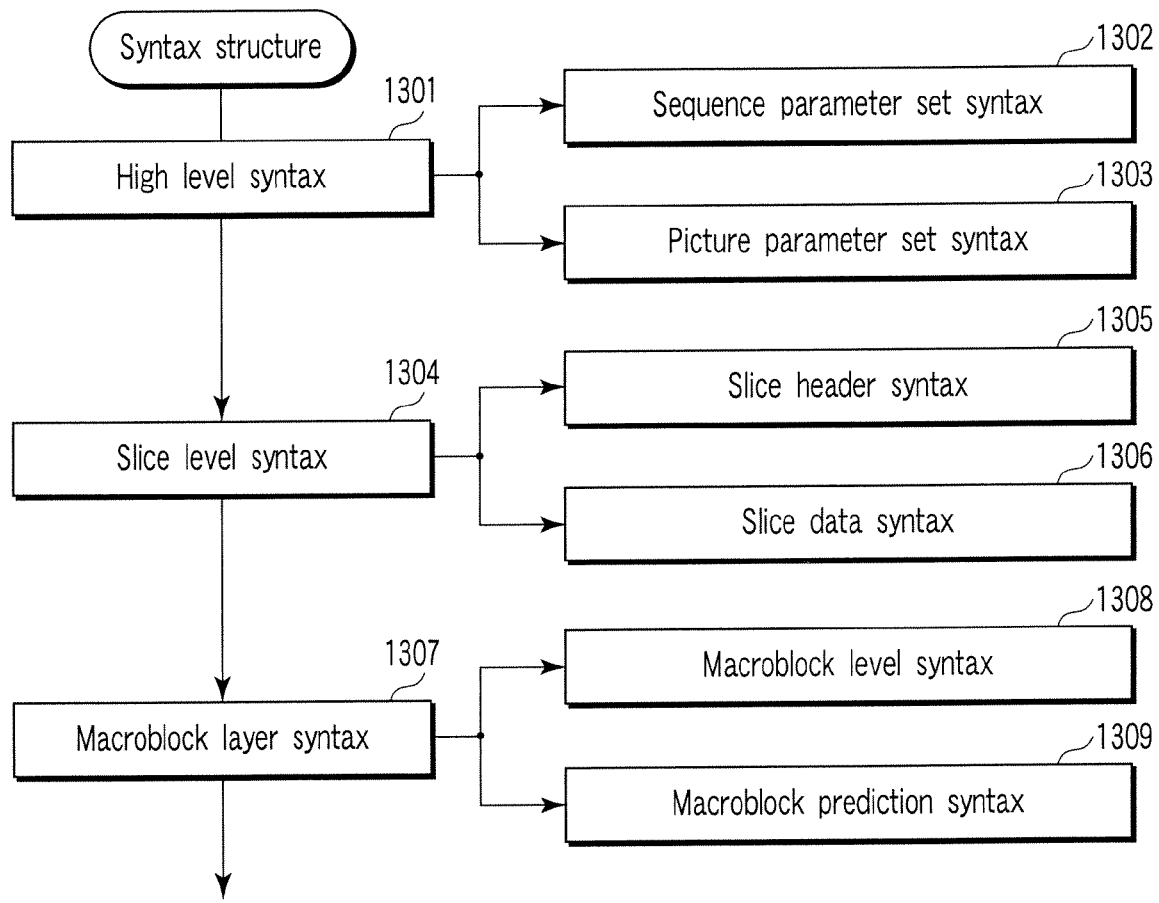
F I G. 13
```
seq_parameter_set( ) {
    ...
    ex_adaptive_intra_in_seq_flag
    ...
}
```
F I G. 14

FIG. 15
```
pic_parameter_set( ) {
  ...
    ex_adaptive_intra_in_pic_flag
  ...
}
```

FIG. 16
```
slice_header( ) {
  ...
    ex_adaptive_intra_in_slice_flag
  ...
}
```

FIG. 17
```
macroblock_layer( ) {
  ...
    if(ex_adaptive_intra_in_seq_flag||ex_adaptive_intra_in
    _slice_flag||ex_adaptive_intra_in_pic_flag){
       if(mb_type==I_N×N){
          ex_adaptive_intra_flag
       }
    }
  ...
}
```

FIG. 18
```
seq_parameter_set( ) {
  ...
    ex_direct_intra_in_seq_flag
  ...
}
```

```
pic_parameter_set( ) {
  ...
    ex_direct_intra_in_pic_flag
  ...
}
```

FIG. 19

```
slice_header( ) {
  ...
    ex_direct_intra_in_slice_flag
  ...
}
```

FIG. 20

```
macroblock_layer( ) {
  ...
  if(ex_adaptive_intra_in_seq_flag||ex_adaptive_intra_in
  _slice_flag||ex_adaptive_intra_in_pic_flag){
    if(mb_type==I_NXN){
      ex_direct_intra_flag
    }
  }
  ...
}
```

FIG. 21A

```
mb_pred(mb_type){
...
  if( !ex_direct_intra_flag){
    if(mb_type==Intra_4x4 )
      for(i4X4Idx=0; i4x4Idx<16; i4x4Idx++){
        prev_intra4x4_pred_mode_flag[ i4x4Idx]
        if( !prev_intra4x4_pred_mode_flag[ i4x4Idx])
          rem_intra4x4_pred_mode[ i4x4Idx]
      }
    if(mb_type==Intra_8x8)
      for(i8X8Idx=0; i8x8Idx<16; i8x8Idx++){
        prev_intra8x8_pred_mode_flag[ i8x8Idx]
        if( !prev_intra8x8_pred_mode_flag[ i8x8Idx])
          rem_intra8x8_pred_mode[ i8x8Idx]
      }
  }
  ... }
}
```

FIG. 21B

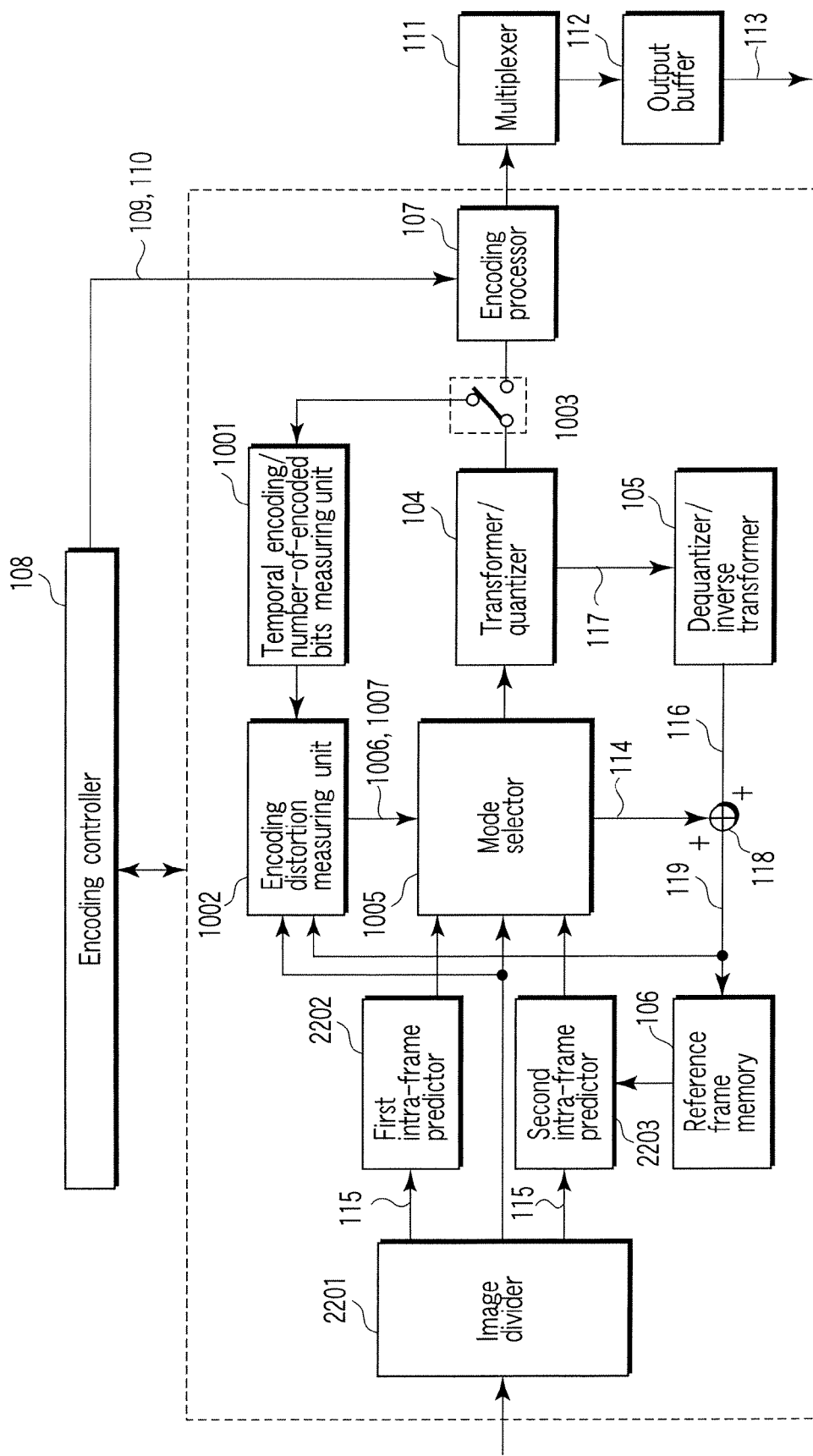
F I G. 22

FIG. 23

```
pic_parameter_set( ) {
  ...
    ex_adaptive_blocksize_in_pic_flag
  ...
}
```

FIG. 24

```
seq_parameter_set( ) {
  ...
    ex_adaptive_blocksize_in_seq_flag
  ...
}
```

FIG. 25

```
slice_header( ) {
  ...
    ex_adaptive_blocksize_in_slice_flag
  ...
}
```

FIG. 26

```
macroblock_layer( ) {
  ...
  if(ex_adaptive_blocksize_in_seq_flag||ex_adaptive_
  blocksize_in_pic_flag||ex_adaptive_blocksize_in_slice_flag){
    if(mb_type==I_N×N){
       ex_adaptive_blocksize_mode
    }
  }
  ...
}
```

| mb_type | Name of mb_type | MbPartPredMode | Intra16x16PredMode |
|---|---|---|---|
| 0 | I_NxN | Intra_4x4 | - |
| 1 | I_NxN | Intra_8x8 | - |
| 2 | I_NxN | Intra_0_0_1_1 | - |
| 3 | I_NxN | Intra_1_1_0_0 | - |
| 4 | I_NxN | Intra_1_0_1_0 | - |
| 5 | I_NxN | Intra_0_1_0_1 | - |
| 6 | I_16x16 | Intra_16x16 | I16Mode |
FIG. 27
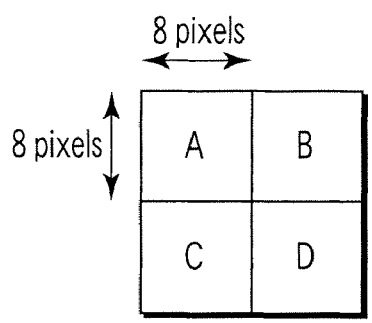
FIG. 28A
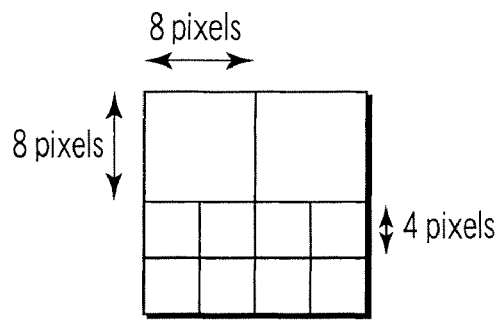
FIG. 28B

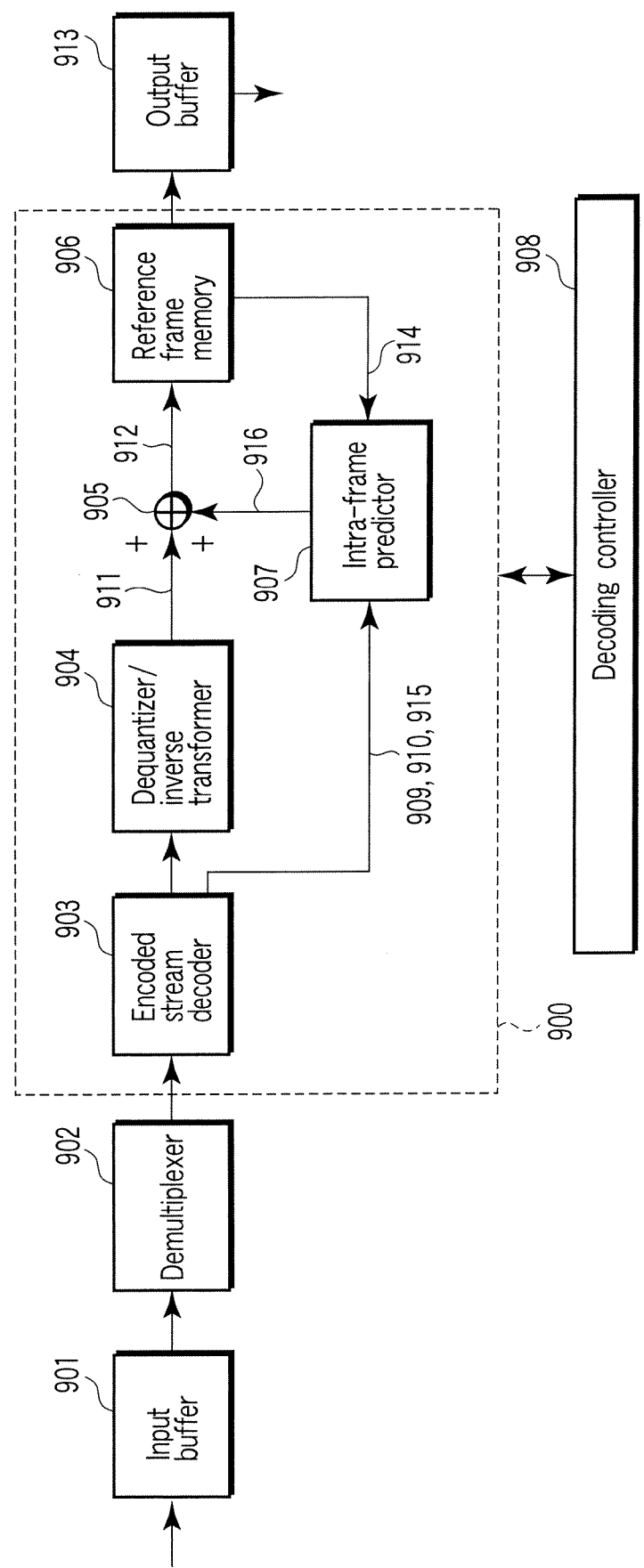
F I G. 29

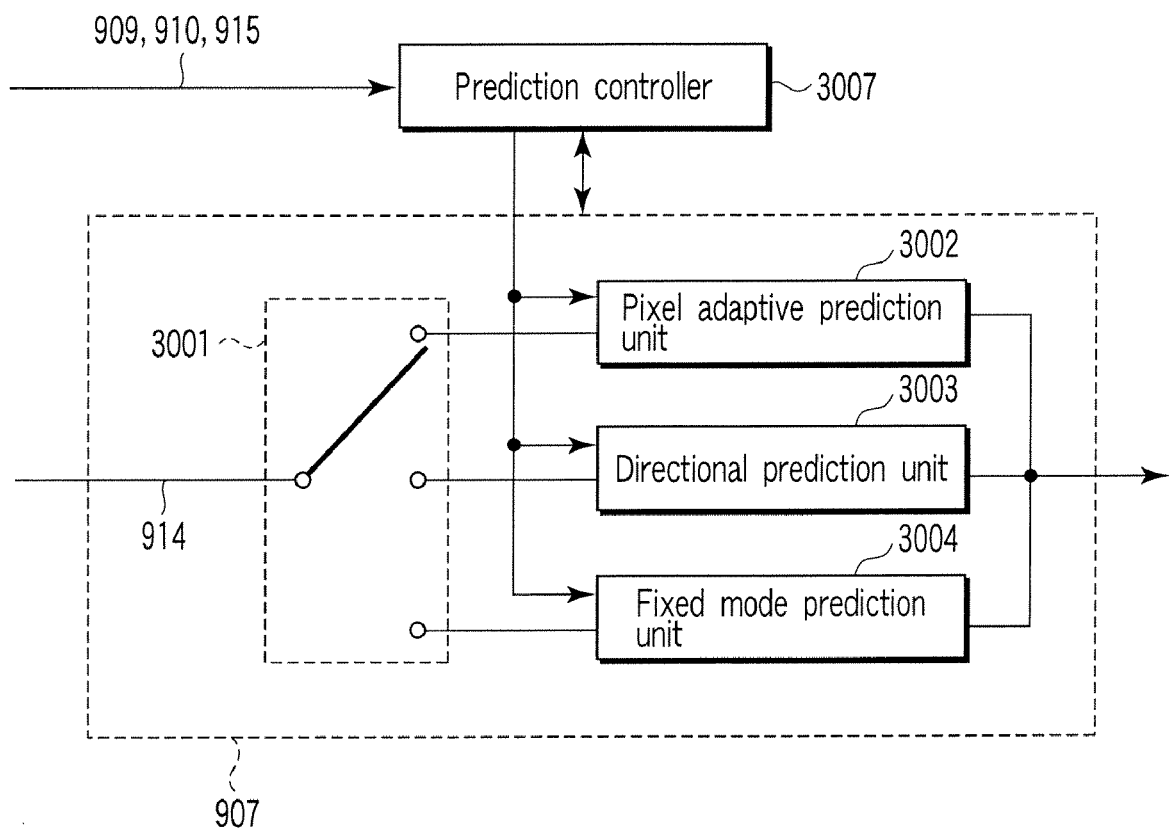
F I G. 30

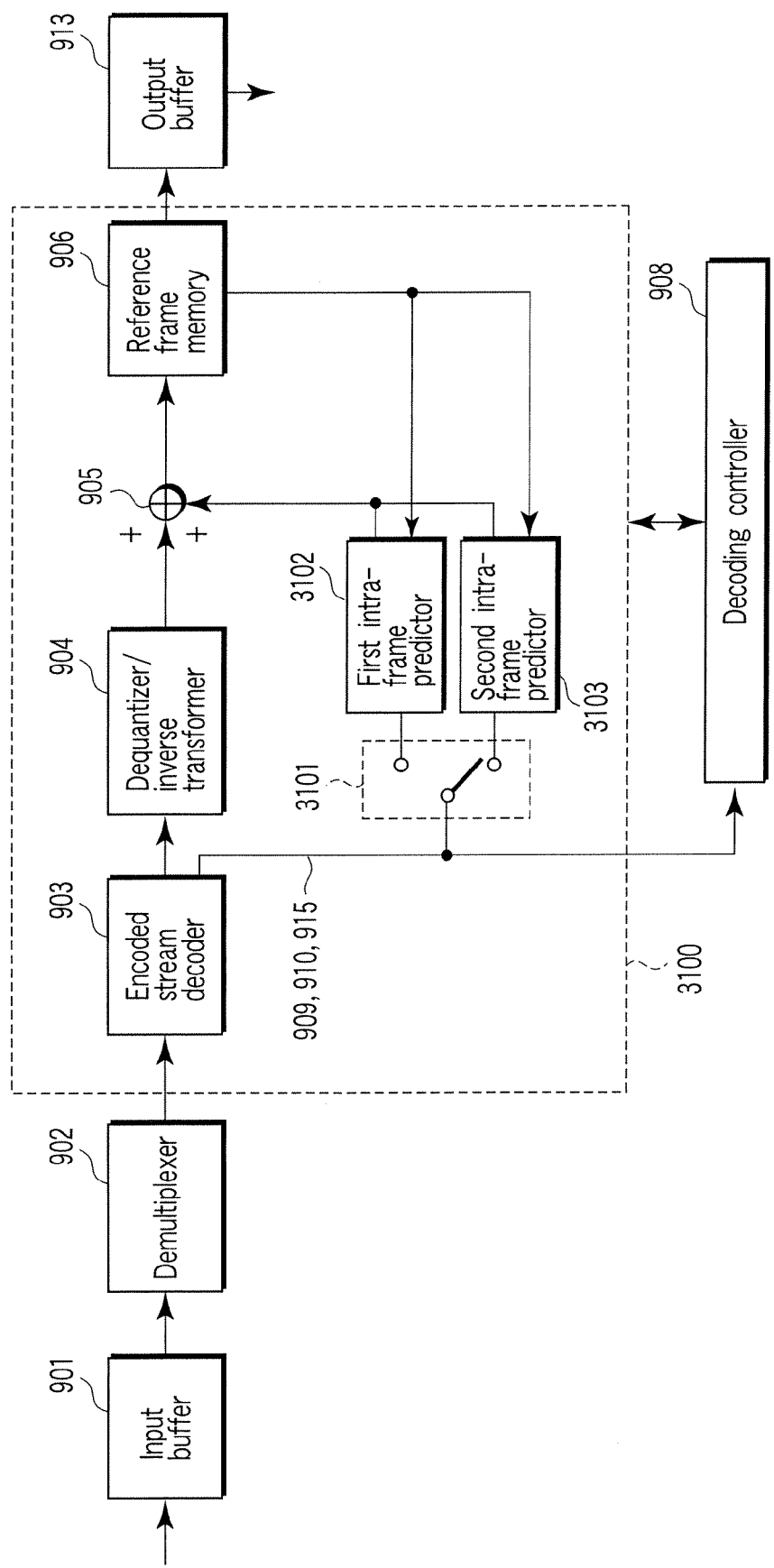
F I G. 31

IMAGE ENCODING/IMAGE DECODING METHOD AND IMAGE ENCODING/IMAGE DECODING APPARATUS

CROSS-REFERENCE TO RELATED APPLICATIONS

This application is based upon and claims the benefit of priority from prior Japanese Patent Application No. 2005-347121, filed Nov. 30, 2005, the entire contents of which are incorporated herein by reference.

BACKGROUND OF THE INVENTION

1. Field of the Invention

The present invention relates to an image encoding method and an image decoding method for use in moving image or still image, and an image encoding apparatus and an image decoding apparatus.

2. Description of the Related Art

In recent years, a video encoding method by which coding efficiency is largely improved compared with a conventional art is urged as ITU-TRec.H.264 and ISO/IEC14496-10 (referred to as "H.264") jointly with ITU-T and ISO/IEC. The conventional encoding system such as ISO/IECMPEG-1,2,4, ITU-TH.261, H.263 performs intra prediction on an orthogonal-transformed frequency domain (DCT coefficients) to reduce the number of encoded bits of the transform coefficients. H.264 takes in a directional prediction in a space region (pixel region) (non-patent literature 1) to realize the high prediction efficiency in comparison with intra prediction of a conventional video encoding system (ISO/IECMPEG-1, 2,4).

In H.264 high profile, etc., three kinds of intra prediction systems are defined for a luminance signal, and one of the systems can be selected in units of macroblock (16×16-pixel block). The prediction systems are referred to as 4×4-pixel prediction, 8×8-pixel prediction, and 16×16-pixel prediction, respectively.

Four encoding modes are defined for the 16×16-pixel prediction, and referred to as a vertical prediction, a horizontal prediction, a DC prediction, and a plane prediction. The pixel value of surrounding decoded macroblocks before being subjected to a deblocking filter is used as a reference pixel value and utilized for a prediction process.

The 4×4-pixel prediction divides a luminance signal in the macroblock into 16 4×4-pixel blocks, and selects one of nine modes for each 4×4-pixel block. The nine modes each have a prediction direction in units of 22.5 degrees except for DC prediction (mode 2) to predict with an average of available reference pixels, and extrapolates the macroblock in the prediction direction using the reference pixel to generate a predicted value. The mode information of the 4×4-pixel prediction needs 16 information items per one macroblock. Because the 4×4-pixel prediction is small in unit of a prediction process, prediction of the comparatively high efficiency can be performed on an image having a complicated texture. However, this 4×4-pixel prediction is prediction done only by copying an interpolation value simply in the prediction direction, so that there is a problem that the prediction error increases as the distance with respect to the reference pixel increases.

The 8×8-pixel prediction divides a luminance signal in the macroblock into four 8×8-pixel blocks, and any one of the nine modes is selected for each 8×8-pixel block. The 8×8-pixel prediction mode is designed by the same framework as the 4×4-pixel prediction, performs filtering of three taps on the already encoded reference pixel, and includes a process to average distortion by flatting the reference pixel used for prediction. However, there is a problem that the prediction does not prove right more and more with increase of a distance with respect to the reference pixel like the 4×4-pixel prediction. There is a problem that prediction precision cannot be expected for an image having a complicated texture since the distance with respect to the reference pixel becomes longer compared with the 4×4-pixel prediction.

The 8×8-pixel prediction is a prediction unit prescribed only by a H.264 high profile, and introduced, in particularly, for the purpose of improving coding efficiency with a high-resolution image. A 4×4-pixel transformed/quantized block size is used in the 4×4-pixel prediction, and a 8×8 pixel transformed/quantized block size is used in the 8×8-pixel prediction. In other words, the transformed/quantized block size is defined by a prediction block shape. Because compatibility of a main profile and a high profile is considered for the prediction block shape, the 8×8-pixel prediction and the 4×4-pixel prediction cannot be coexisted in a macroblock in a standard.

In order to reduce the number of encoded bits of mode information, the 4×4-pixel prediction or 8×8-pixel prediction of H.264 reduces the number of encoded bits by predicting mode information using correlation level of mode information of adjacent blocks. When the prediction of mode information proves right, a flag of 1 bit is encoded, and when it does not prove right, data of 3 bits further are encoded, whereby the number of encoded bits of mode information is reduced. However, if the 4×4-pixel prediction is selected at a time when the error signal is not almost generated in the macroblock, minimum 16 bits (maximum 64 bits) must be encoded, resulting in largely deteriorating coding efficiency.

JP-A 2003-323736 (KOKAI) proposes a system for performing prediction by blockmatching in a frame and supplement of a prediction value of a predictive block from the encoded reference image. This system is a prediction method premising that an image of an arbitrary encoded block in a frame is similar to that of a block to be predicted, and has a problem that the prediction precision is poor when correlation of blocks in a frame is low. The position displacement quantity showing a position of a reference image used in the prediction must be encoded, resulting in increasing the number of encoded bits of mode information.

As discussed above, in the case where interpolated pixels according to a prediction mode is generated from an encoded reference image by a method prescribed in a H.264 high profile, and a predictive image signal is generated by copying the interpolated pixels in a direction prescribed by a prediction mode, there occurs a problem that a prediction error increases as the distance between the prediction pixel and the reference pixel increases in the prediction direction, resulting in that prediction block shapes cannot be coexisted in the macroblock, and the number of encoded bits of mode information cannot be decreased.

BRIEF SUMMARY OF THE INVENTION

An aspect of the present invention provides an image coding method comprising: dividing an input picture into a plurality of pixel block signals; performing intra prediction for extrapolating or interpolating a prediction pixel using reference pixels changed in number according to a distance between the prediction pixel and a reference pixel in plural prediction modes each representing a prediction direction; generating a predictive image signal by extrapolating or interpolating the prediction pixel; calculating a prediction error signal from the pixel block signal and the predictive image signal; selecting one prediction mode of the plural prediction modes using the prediction error signal; and performing entropy-coding using the prediction error signal based on the selected prediction mode.

BRIEF DESCRIPTION OF THE SEVERAL VIEWS OF THE DRAWINGS

FIG. 1 is a block diagram of a video encoding apparatus according to a first embodiment.

FIGS. 6A to 6C are diagrams indicating pixel adaptive predictions related to the embodiment.

FIG. 7 is a diagram showing a weighted table of the number of reference pixels and filter coefficients which are used at the time of a pixel adaptive vertical prediction according to the embodiment.

FIG. 8 is a diagram showing adjacent blocks used in the prediction mode according to the embodiment.

FIG. 9 is a diagram indicating the directional prediction and pixel adaptive prediction according to the embodiment

FIG. 12 is a flow chart of the video encoding apparatus according to the embodiment.

FIG. 13 is a schematic illustration of syntax structure according to the embodiment.

FIG. 14 is a diagram showing a data structure of a sequence parameter set syntax according to the embodiment.

FIG. 15 is a diagram showing a data structure of a picture parameter set syntax according to the embodiment.

FIG. 16 is a diagram showing a data structure of a slice header syntax according to the embodiment.

FIG. 17 is a diagram showing a data structure of a macroblock layer syntax according to the embodiment.

FIG. 18 is a diagram showing a data structure of a sequence parameter set syntax according to the embodiment.

FIG. 19 is a diagram showing a data structure of a picture parameter set syntax according to the embodiment.

FIG. 20 is a diagram showing a data structure of s slice header syntax according to the embodiment.

FIGS. 21A and 21B are diagrams showing data structures of macroblock layer syntax according to the embodiment.

FIG. 22 is a block diagram of a video encoding apparatus according to a third embodiment.

FIG. 23 is a diagram showing a data structure of a sequence parameter set syntax according to the embodiment.

FIG. 24 is a diagram showing a data structure of a picture parameter set syntax according to the embodiment.

FIG. 25 is a diagram showing a data structure of a slice header syntax according to the embodiment.

FIG. 26 is a diagram showing a data structure of a macroblock layer syntax according to the embodiment.

FIG. 27 is a diagram showing a data structure of mb_type according to the embodiment.

FIGS. 28A and 28B are diagrams showing data structures of block size switching according to the embodiment.

FIG. 29 is a block diagram of a video decoding apparatus according to a fourth embodiment.

FIG. 30 is a block diagram of an intra predictor of the video decoding apparatus according to the embodiment.

FIG. 31 is a block diagram of a video decoding apparatus according to a fifth embodiment.

DETAILED DESCRIPTION OF THE INVENTION

There will now be described a video encoding method, a video encoding apparatus, a video decoding method and video decoding apparatus in detail referring to accompanying drawings.

First Embodiment

Figure 4A:
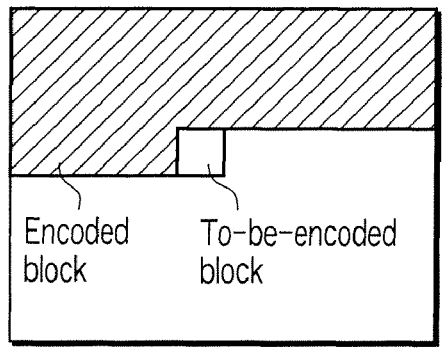
FIGS. 4A to 4E are diagrams of block shapes related to the embodiment.

The video encoding apparatus 100 shown in FIG. 1 is configured to divide a video signal into a plurality of pixel blocks, and encode them. This video encoding apparatus 100 prepares a plurality of frame prediction modes which differ in block size and generation method of a predictive image signal from one another. Intra prediction is a prediction system which prediction is closed in a frame, and predicts a to-be-predicted block using an already encoded reference pixel. It is assumed that an encoding process is executed from an upper left to a lower right as shown in FIG. 4A in this embodiment.

The video signal input to the video encoding apparatus 100 is divided into a plurality of pixel blocks as an input image signal 115 with an image divider 101. A part of divided input image signal 115 is input to an intra predictor 102, and finally encoded with an encoding processor 107 via a mode selection unit 103 and a transformer/quantizer 107 to output coded data 113.

Figure 4B:
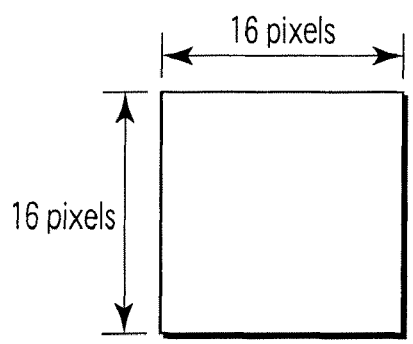

The image divider 101 divides a video signal into a plurality of pixel blocks to generate a 16×16-pixel block for each pixel block as shown in FIG. 4B. This 16×16-pixel block is referred to as a macroblock, and becomes a basic process block size for the following encoding process. The video encoding apparatus 100 encodes the video signal in units of this macroblock.

Figure 4C:
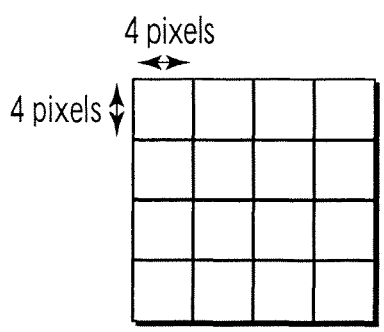
Figure 4D:
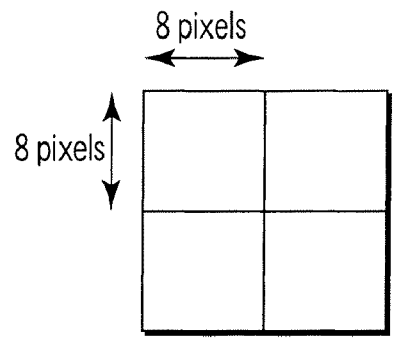

The intra predictor 102 extrapolates the image signal for all selectable prediction modes in units of macroblock to generate a predictive image signal 114, using the reference pixel stored temporarily in the reference image memory 106. In other words, the intra predictor 102 generates predictive image signals 114 for all of modes executable for the prediction pixel block by intra-picture prediction, for example, intra prediction. However, when next prediction cannot be done unless a local decoded image is generated in a macroblock like intra prediction of H.264 (4×4-pixel prediction (referring to FIG. 4C) or 8×8-pixel prediction (referring to FIG. 4D), transformation and quantization, dequantization and inverse transformation may be done in the intra predictor 102. However, a predictive image signal is generated only with the intra predictor 102.

The predictive image signal 114 generated with the intra predictor 102 is sent to the mode selector 103. The mode selector 103 generates a prediction error signal 116 by subtracting the predictive image signal 114 from an input image signal 115. The mode selector 103 selects a prediction mode based on mode information predicted with the intra predictor 102 and the generated prediction error signal 116. Explaining the embodiment in concrete, a cost expressed by the following equation is used.

$$K = SAD + \lambda \times OH \quad (1)$$

where OH indicates mode information, SAD indicates the absolute sum of prediction error signals, and λ is a constant and determined based on a quantization scale or a value of quantization parameter. The prediction mode is determined by a cost obtained in this way. The prediction mode by which the cost k becomes minimum is selected as an optimal prediction mode.

In this embodiment, the mode information and the absolute sum of prediction errors are used. However, only the mode information or only the absolute sum of prediction errors may be used for selecting a prediction mode. The mode information and the absolute sum of prediction errors may be subjected to Hadamard transform, or the values similar to these may be used. Further, the cost may be obtained using activity of an input image signal, and a cost function may be obtained using a quantization scale and a quantization parameter.

The mode selector 103 is connected to the transformer/quantizer 104, and the mode information and the prediction error signal selected with the mode selector 103 are input to the transformer/quantizer 104. The transformer/quantizer 104 performs orthogonal transform on the input prediction error signal to generate transform coefficient data. The transformer/quantizer 104 transforms the prediction error signal to coefficients using DCT, etc., in the present embodiment, but may transform the prediction error signal into coefficients using a technique such as wavelet transform or independent component analysis. The transformer/quantizer 104 quantizes the transform coefficients. The quantization parameter needed by quantization is set with an encoding controller 108.

The quantized transform coefficient 117 is output to the encoding processor 107 along with information related to a prediction method such as prediction information 109 and a quantization parameter. The encoding processor 107 performs entropy-encoding (Huffman encoding or arithmetic encoding) on the quantized transform coefficient and the input prediction information, etc. The data entropy-encoded with the encoding processor 107 is multiplexed with the prediction information 109, etc. with the multiplexer 111, and output as coded data 113 through an output buffer 112.

The dequantizer/inverse transformer 105 dequantizes the transform coefficient 117 quantized with the transformer/quantizer 104 according to a quantization parameter set with the encoding controller 108 and subjects the transform coefficient to inverse transform (inverse DCT, for example) to decode the transform coefficient to a prediction error signal 116.

The prediction error signal 116 decoded with the dequantizer/inverse transformer 105 is added to a predictive image signal 114 of a selection prediction mode supplied from the mode selector 103 with an adder 118. An addition signal becomes a decoded picture signal 119 and input to a reference image memory 106. The reference image memory 106 accumulates the decoded picture signal 119 as a reference image. The reference image accumulated to the reference image memory 106 is referred to in generating a prediction error signal with the intra predictor 102.

An encoding loop (a process performed in order of intra predictor 102→mode selector 103→transformer/quantizer 104→inverse transformer/dequantizer 105→reference image memory in FIG. 1) corresponds to one loop when the encoding process is performed for all prediction modes selectable in the macroblock. When the encoding loop is finished for the prediction macroblock, the input image signal 115 of the next block is input to be encoded.

The encoding controller 108 performs feedback control of the number of encoded bits, quantization characteristic control, coding mode control, etc. Further, the encoding controller 108 performs rate control to control the number of encoded bits and control of the prediction unit, and control of the whole of encoding.

The function of each of the above mentioned parts can be realized by a program stored in a computer.

Figure 2:
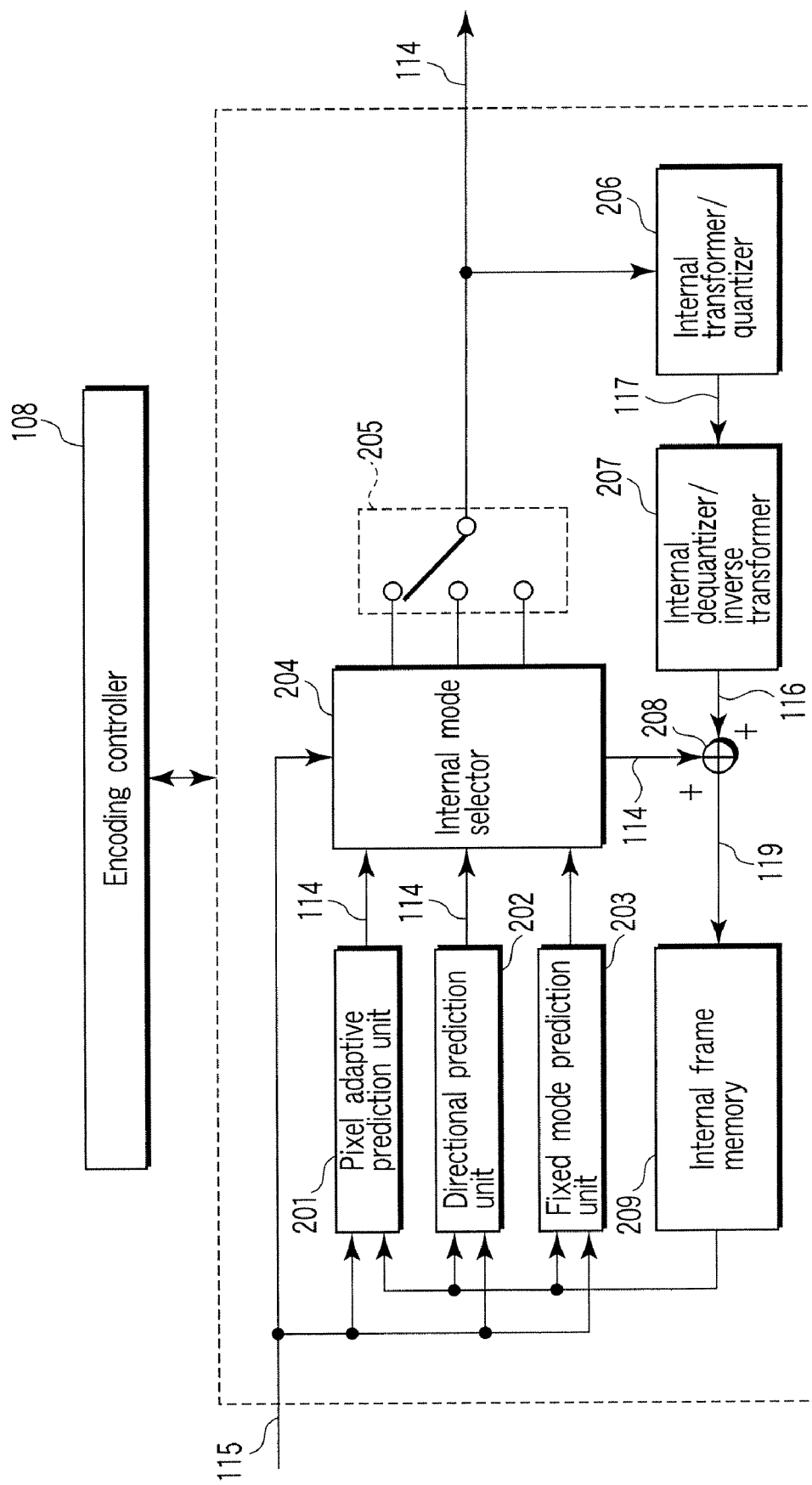
FIG. 2 is a block diagram of the intra predictor according to the embodiment.

The intra predictor of the video encoding apparatus 100 for implementing the video encoding method according to the present embodiment is explained referring to FIG. 2. The description of the parts similar to those shown in FIG. 1 is omitted as appropriate.

The intra predictor 102 comprises an internal mode selector 204, an internal transformer/quantizer 206, an internal dequantizer/inverse transformer 207, and an internal reference image memory 209 to perform prediction in a block size smaller than the macroblock size. A pixel adaptive prediction unit 201 and a directional prediction unit 202 each comprise a plurality of prediction modes, but differ in prediction method from each other. A fixed mode prediction unit 203 predicts a prediction block using a prediction method of a pixel adaptive prediction unit 201 and a directional prediction unit 202, but executes one of the prediction modes, which does not send mode information in macroblock level.

Figures 5A, 5B, 5C, 5D:
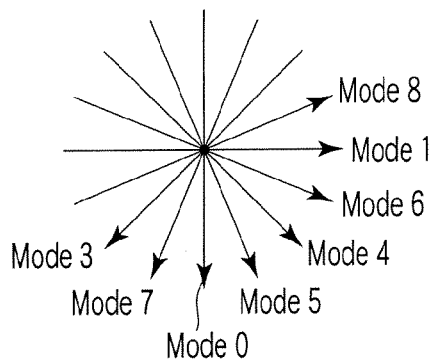
FIGS. 5A to 5D are diagrams indicating directional predictions related to the embodiment.

The directional prediction unit 202 and pixel adaptive prediction unit 201 will be explained in detail. These prediction units predict a prediction block using the already decoded reference pixel held in the reference image memory 106. There are nine prediction modes having prediction directions different from one another by every 22.5 degrees except for the mode 2 as shown in FIG. 5A. The modes 0 and 1 and 3 to 8 aside from the mode 2 are described, and the mode 2 describes a DC prediction with the directional prediction unit 202. The mode name of directional prediction done with the directional prediction unit 202 and the mode name of pixel adaptive prediction done with the pixel adaptive prediction unit 201 are shown in FIG. 9. The relation between the prediction block for 4×4-pixel prediction and the reference pixel is shown in FIG. 5B. The pixels of upper-case characters A to M are reference pixels, and the pixels of lower-case characters a to p are prediction pixels.

At first, the prediction method of the directional prediction unit 202 is explained. When the DC prediction of the mode 2 is selected, the directional prediction unit 202 calculates the prediction pixel according to the following equation (2).

$$H=(A+B+C+D), V=(I+J+K+L)$$

$$a \text{ to } p=(H+V+4)>>3 \quad (2)$$

When the reference pixel cannot be used, the prediction pixel is predicted by an average of available reference pixels. If there is no available reference pixel, the prediction value is calculated by a half value (128, if it is 8 bit) of the maximum luminance value of the encoding apparatus. When other modes are selected, the directional prediction unit 202 uses a prediction method of copying a prediction value interpolated from the reference pixel in a prediction direction shown in FIG. 5A. More specifically, a method of generating the prediction value when the mode 0 (vertical prediction) is selected is explained based on the following equation (3).

$$a,e,i,m=A$$

$$b,f,j,n=B$$

$$c,g,k,o=C$$

$$d,h,l,p=D \quad (3)$$

This prediction mode can be selected only when the reference pixels A to D are available. The detail of the prediction method is shown in FIG. 5C. The brightness values of the reference pixels A to D are copied on the prediction pixels in a vertical direction, and supplemented as prediction values.

A prediction method when the prediction mode 4 (diagonal-down-right prediction) is selected is explained based on the following equation (4).

$$d=(B+(C<<1)+D+2)>>2$$

$$c,h=(A+(B<<1)+C+2)>>2$$

$$b,g,l=(M+(A<<1)+B+2)>>2$$

$$a,f,k,p=(I+(M<<1)+A+2)>>2$$

$$e,j,o=(J+(I<<1)+M+2)>>2$$

$$i,n=(K+(J<<1)+I+2)>>2$$

$$m=(L+(k<<1)+J+2)>>2 \qquad (4)$$

This prediction mode can be selected only when the reference pixels A to D and I to M are available. This prediction mode is shown in FIG. 5D in detail. A value generated with a filter of three taps is copied on the prediction pixel in a lower-right direction at 45 degrees and supplemented as a prediction value.

A configuration approximately similar to the above is used for a prediction method aside from the prediction modes 0, 2, 4. In other words, an interpolation value is generated from the reference pixel available in the prediction direction, and a prediction of copying the value to the prediction pixel according to the prediction direction is done.

The pixel adaptive prediction unit 201 will be explained. The pixel adaptive prediction unit 201 performs prediction by changing the number of using reference pixels according to a distance between the prediction pixel and the reference pixel. The prediction value changes in units of pixel. The intra prediction is prediction using a spatial correlation of images, and generates a prediction value based on the assumption that the brightness values of adjacent pixels are similar. When the distance between the prediction pixel and the available reference pixel increases, this assumption does not work out, resulting in tending to increase a prediction error. For this reason, when the distance between the prediction pixel and the reference pixel increases, the prediction error is decreased by increasing the number of available pixels according to the increasing distance. Further, the prediction value of high precision can be generated by changing a weighted table of available reference pixel according to the distance.

Figures 6A, 6B:
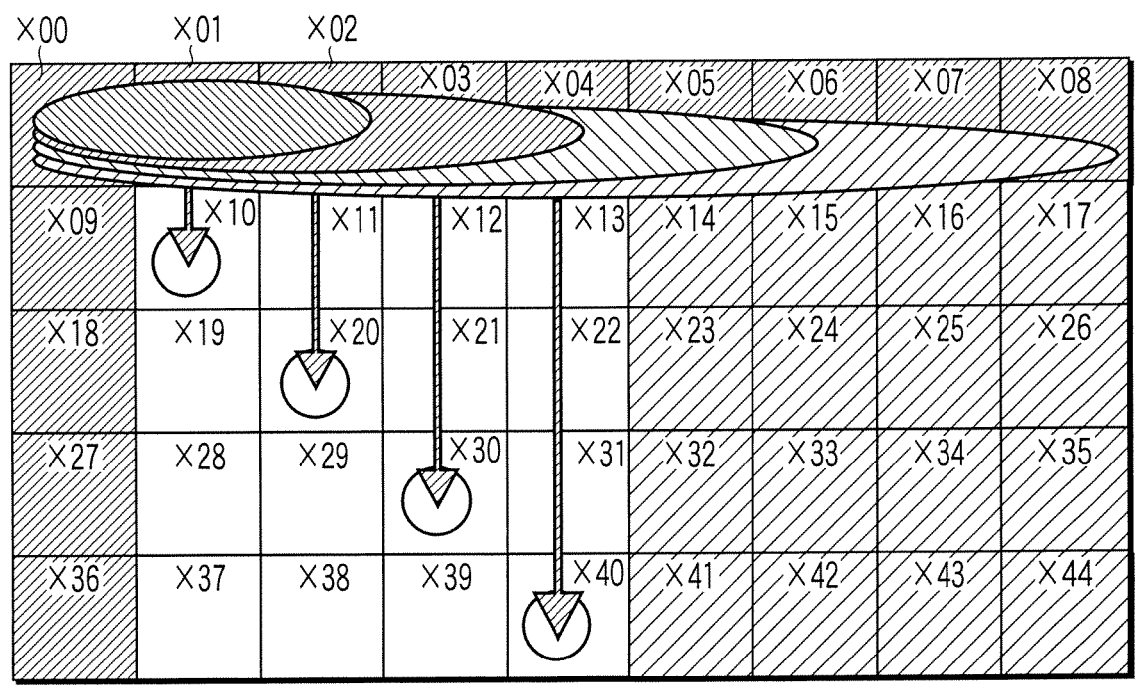

The prediction mode is similar to that explained in FIG. 5A. The relation between the reference pixel and the prediction block is shown in FIG. 6A. The reference pixel and prediction pixel shown in FIG. 6A and FIG. 5B correspond to one-to-one. However, different indexes are given to these pixels for the purpose of facilitating explanation of a prediction equation. The reference pixels are 13 pixels of x00 to x08 and x09, x18, x27, x36. The prediction pixels are 16 pixels of x10 to x13, x19 to x22, x28 to x31, and x37 to x40. 16 pixels x14 to x17, x23 to x26, x32 to x35, and x41 to x44 are prediction aid pixels, and used to raise the prediction precision.

A prediction value generation method concerning the pixel adaptive vertical prediction (mode 0) will be explained in detail. The method of the pixel adaptive vertical prediction is shown in FIG. 6B. As seen from FIG. 6B, the prediction value is determined using reference pixels increasing in number as the distance between the reference pixel and the prediction pixel increases. For example, in the prediction pixel x10 away from the reference pixel by one pixel in the prediction direction, the prediction value is calculated using three reference pixels x00, x01 and x02. In the prediction pixel x20 away from the reference pixel by two pixels in the prediction direction, the prediction value is calculated using fifth reference pixels x00, x01, x02, x03 and x04. In the prediction pixel x30 away from the reference pixel by three pixels in the prediction direction, the prediction value is calculated using fifth reference pixels x00, x01, x02, x03, x04, x05 and x06. In the pixel x40 away from the reference pixel by four pixels in the prediction direction, the prediction value is calculated using fifth reference pixels x00, x01, x02, x03, x04, x05, x06, x07 and x08.

The prediction value generation method will be explained concretely according to the following equation (5). In the pixel adaptive vertical prediction, the prediction pixel is calculated using the following equation (5).

$$X(n)=(X(n-d-1)+(X(n-d)<<1)+X(n-d+1)+2)>>2 \qquad (5)$$

where n indicates an index corresponding to a prediction pixel position (x10 to x13, x19 to x22, x28 to x31 and x37 to x40) shown in FIG. 6A. d is given by the following equation.

$$d=(blk\_num<<1)+1 \qquad (6)$$

where blk_num is 4 in a 4×4-pixel block, and 8 in a 8×8-pixel block.

It can be thought that this prediction system not only predicts a pixel using the already encoded reference pixel but also predicts a next pixel using the already encoded prediction pixel. FIG. 6 shows this concept. In order for an intended prediction pixel to be obtained, this prediction system is like performing prediction using a prediction pixel that the distance with respect to the reference pixel is short by one pixel. The prediction method shown in FIG. 6B is obtained if the equation (5) is developed by putting the prediction value in the equation (5).

If the equation (5) is developed according to the distance between the reference pixel and the prediction pixel, the following prediction equation (7) is established.

$$X(n) = \sum_{i=-L}^{L} h_i X(n - V_i) \qquad (7)$$

L represents a distance between the reference pixel and the prediction pixel. Vi indicates an index determined according to the corresponding prediction mode. In represents a filter coefficient, and the number of taps changes according to L. In and Vi are explained about the pixel adaptive vertical prediction in concrete. FIG. 7 shows an example of a weight filter coefficient hi (weighted table) used according to the distance between the reference pixel and the predictive image in the 4×4-pixel prediction.

The prediction pixel away from the reference pixel by one pixel in the prediction direction is predicted by the following equation (8) using three pixels.

$$X(n)=(X(n-d-1)+(X(n-d)<<1)+X(n-d+1)+2)>>2 \qquad (8)$$

where n indicates an index corresponding to L=1(x10 to x13). The filter coefficient is hi=(1,2,1), and corresponds to Vi=(d+1, d, d−1).

The prediction pixel away from the reference pixel by two pixels is predicted by the following equation (9) using fifth pixels.

$$X(n)=(X(n-(d<<1)-2)+(X(n-(d<<1)-1)<<2)+(6x(n-(d<<1)))+(X(n-(d<<1)+1)<<2)+X(n-(d<<1)+2)+8)>>4 \qquad (9)$$

where n indicates an index corresponding to L=2 (x19 to x22). The filter coefficient is hi=(1, 4, 6, 4, 1), and corresponds to Vi=(2d+2, 2d+1, 2d, 2d−1, 2d−2).

The prediction pixel away from the reference pixel by three pixels is predicted by the following equation (10) using seven pixels.

$$X(n) = (X(n-3d-3)+(6X(n-3d-2))+ \\ (15X(n-3d-1))+(20X(n-3d))+(15X(n-3d+1))+ \\ (6X(n-3d+2))+X(n-3d+3)+32)>>6 \quad (10)$$

where n indicates an index corresponding to L=3 (x28 to x31). The filter coefficient is hi=(1, 6, 15, 20, 15, 6, 1) and corresponds to Vi=(3d+3, 3d+2, 3d+1, 3d, 3d−1, 3d−2, 3d−3).

The prediction pixel away from the reference pixel by four pixels is predicted by the following equation (11) using seven pixels.

$$X(n) = (X(n-(d<<2)-4)+(X(n-(d<<2)-3)<<3)+ \\ (28X(n-(d<<2)-2))+(56X(n-(d<<2)-1))+ \\ (70X(n-(d<<2)))+(56X(n-(d<<2)+1))+ \\ (28X(n-(d<<2)+2))+(X(n-(d<<2)+3)<<3)+ \\ X(n-(d<<2)+4)+128)>>8 \quad (11)$$

where n indicates an index corresponding to L=4 (x37 to x40). The filter coefficient is hi=(1, 8, 28, 56, 70, 56, 28, 8, 1) and corresponds to Vi=(4d+4, 4d+3, 4d+2, 4d+1, 4d, 4d−1, 4d−2, 4d−3, 4d−4).

The reference pixels used for prediction, the number of reference pixels and a weighted table are obtained by developing the equation (5). The interpolation value of the prediction pixel is calculated using this table. When the interpolation value of the pixel x31 is calculated, from the table of FIG. 7, the filter coefficient hi=(1, 6, 15, 20, 15, 6, 1) is used in L=3. The following prediction equation (12) is established by the equation (9).

$$X(31)=(X(01)+(6X(02))+(15X(03))+(20X(04))+(15X(05))+(6X(06))+X(07)+32)>>6 \quad (12)$$

When there is no corresponding reference pixel, the prediction is done by putting the last reference pixel value in the prediction equation. When the pixel x19 is predicted, the reference pixel on the left of the pixel x00 cannot be used. However, since the reference pixel x09 can be used, the prediction is done according to the following equation (13).

$$X(19)=(X(09)+(X(00)<<1)+(5X(01))+(X(02)<<2)+X(03)+8)>>4 \quad (13)$$

In this case, the equation (12) is established by determining the pixel used for prediction in the equation (5) and developing a necessary prediction value.

A prediction equation for the pixel adaptive horizontal prediction (mode 1) is expressed by the following equation (14).

$$X(n)=(X(n-d-1)+(X(n-1)<<1)+X(n+d-1)+2)>>2 \quad (14)$$

A prediction equation for the pixel adaptive adjacent prediction (mode 2) is expressed by the following equation (15).

$$X(n)=(X(n-1)+X(n+d)+1)>>1 \quad (15)$$

A prediction equation for the pixel adaptive diagonal-down-left prediction (mode 3) is expressed by the following equation (16).

$$X(n)=(X(n-d)+(X(n-d+1)<<1)+X(n-d+2)+2)>>2 \quad (16)$$

A prediction equation for the pixel adaptive diagonal-down-right prediction (mode 4) is expressed by the following equation (17).

$$X(n)=(X(n-d)+(X(n-d-1)<<1)+X(n-1)+2)>>2 \quad (17)$$

A prediction equation for the pixel adaptive vertical-right prediction (mode 5) is expressed by the following equation (18).

$$X(n)=(X(n-d)+X(n-d-1)+1)>>1 \quad (18)$$

A prediction equation for the pixel adaptive horizontal-down prediction (mode 6) is expressed by the following equation (19).

$$X(n)=(X(n-d-1)+X(n-1)+1)>>1 \quad (19)$$

A prediction equation for the pixel adaptive vertical-left prediction (mode 7) is expressed by the following equation (20).

$$X(n)=(X(n-d)+X(n-d+1)+1)>>1 \quad (20)$$

A prediction equation for the pixel adaptive horizontal-up prediction (mode 8) is expressed by the following equation (21).

$$X(n)=(X(n-1)+X(n+d-1)+1)>>1 \quad (21)$$

In order for the predictive pixel value to be calculated, the necessary predicted image is put in the equation to develop it, similarly to the pixel adaptive vertical prediction. As a result, necessary reference pixels, the number of the reference pixels, and a weighting table are determined.

When there is no reference pixel, the reference pixel is supplemented like the pixel adaptive vertical prediction. When the pixel x37 is predicted by the pixel adaptive horizontal prediction, the reference pixel x45 cannot be used. Therefore, this reference pixel is supplemented by the pixel x36 as shown by the following equation (22).

$$X(37)=(X(36)+(X(36)<<1)+X(27)+2)>>2=(3\times(36)+X(27)+2)>>2 \quad (22)$$

In this way, since the prediction of higher precision is done by changing the number of using reference pixels according to the distance between the prediction pixel and the reference pixel, it becomes possible to improve the coding efficiency. The improvement of prediction precision makes the predictive image close to the input image. Therefore, this is a prediction system having a high effect for sight.

Subsequently, the fixed mode predictor 203 will be described in detail. The fixed mode predictor 203 predicts mode information and performs the pixel adaptive prediction or directional prediction according to the determined prediction mode. The mode information is predicted using mode information of adjacent prediction blocks. Relation between adjacent blocks in case of the 4×4-pixel prediction is shown in FIG. 8. Assuming that the block adjacent to the left side of the prediction block C is A and the block adjacent to the upper side thereof is B. When these two prediction modes are defined as prev_left_mode and prev_upper_mode, the prediction mode of the block C is determined by the following equation (23).

$$\text{current\_mode}=\min(\text{prev\_left\_mode}, \text{prev\_upper\_mode}) \quad (23)$$

where current_mode represents a prediction mode of the prediction block C. The function min(A, B) represents a value of smaller one of A and B. Since the prediction mode information of the prediction block is predicted from the prediction mode information of the surrounding blocks, this mode is one of the encoding modes making it possible to reduce largely the number of encoded bits needed for encoding the prediction mode information. It is determined by an ex_direct_intra flag described below whether the pixel adaptive prediction unit 201 is used to generate the predictive image or the directional prediction unit 202 is used. In other words, it is determined based on ex_direct_intra flag information given from the encoding controller 108.

In the present embodiment, prediction mode information of the current prediction block is determined based on the prediction mode information of the adjacent prediction blocks A and B. As modification of the present embodiment, it is determined based on prediction mode information of surrounding prediction blocks. The prediction mode of the current prediction block may be determined using the prediction mode information of the block on the right side of the prediction block B, the block on the upper side of the prediction block B, the block on the left side of the prediction block A and a block on the upper side of the prediction block A. For example, the most frequent prediction mode among the prediction modes of the surrounding prediction blocks, the median value of the prediction modes of the surrounding prediction blocks or the average of the prediction modes of the surrounding prediction blocks may be determined as the prediction mode of the current prediction block.

The operation of the intra predictor 102 shown in FIG. 2 will be described in detail hereinafter. When the input image signal 115 is input to the intra predictor 102, the signal is input to the pixel adaptive prediction unit 201, the directional prediction unit 202 and the fixed mode predictor 203. The corresponding predictive image signal 114 is generated with each of the pixel adaptive prediction unit 201, the directional prediction unit 202 and the fixed mode predictor 203 according to the prediction mode and the prediction block shape.

Then, if prediction prohibition information for prohibiting the prediction is input from the encoding controller 108, the corresponding prediction unit generates no predictive image signal. More specifically, when the prediction prohibition information is input to the pixel adaptive prediction unit 201, the predictive image signal 114 is not generated from the pixel adaptive prediction unit 201. When the prediction prohibition information is input to the directional prediction unit 202, the predictive image signal 114 is not generated from the directional prediction unit 202. When the prediction prohibition information is input to the fixed mode predictor 203, the predictive image signal 114 is not generated from the fixed mode predictor 203.

When the prediction prohibition information is input to one of the prediction units, the corresponding prediction unit is not connected to the prediction change-over switch 205. It is not allowed that the prediction prohibition information is input to the pixel adaptive prediction unit 201 and the directional prediction unit 202 at the same time.

The predictive image signals 114 and the prediction mode information, which are predicted by each of the prediction units are input to the internal mode selector 204. The internal mode selector 204 generates a prediction error signal 116 obtained by subtracting the predictive image signal 114 from the input image signal 115. The internal mode selector 204 selects a mode based on the mode information predicted by each of the prediction units and the generated prediction error signal 116.

The prediction mode is selected using the cost used in the equation (1). The internal mode selector 204 sends, to the encoding controller 108, mode information representing whether the selected prediction mode is a prediction mode predicted with the pixel adaptive prediction unit 201 or a prediction mode predicted with the directional prediction unit 202. When the pixel adaptive prediction is used, the ex_adaptive intra_flag described below is TRUE, and when the directional prediction is used, the flag is FALSE. The encoding controller 108 controls the prediction change-over switch 205 according to the given mode information. It is determined by the ex_direct_intra_flag whether the fixed mode prediction is done. When the flag is TRUE, the fixed mode prediction is done, and when it is FALSE, the prediction is not done.

When the ex_adaptive_intra_flag is TRUE, the prediction change-over switch 205 is connected to the pixel adaptive prediction unit 201. When the ex_adaptive_intra_flag is FALSE, the prediction change-over switch 205 is connected to the directional prediction unit 202. When the ex_direct_intra_flag is TRUE, the encoding controller 108 connects the change-over switch 205 to the fixed mode determination unit 203.

When the prediction in all pixel blocks is completed, the internal mode selector 204 outputs the predictive image signal 114 for the macroblock and mode information from the intra predictor 102.

The prediction change-over switch 205 is connected to the internal transformer/quantizer 206. The mode information and prediction error signal 114 which are selected with the internal mode selector 204 are input to the internal transformer/quantizer 206 through the change-over switch 205. The internal transformer/quantizer 206 transforms the input prediction error signal 114 into a transform coefficient using discrete cosine transform, etc. and generate transform coefficient data. The prediction error signal 114 may be transformed by the transform such as wavelet transform or independent component analysis. The internal transformer/quantizer 206 quantizes the transform coefficient. The quantization parameter needed for quantization is set with the encoding controller 108.

The internal dequantizer/inverse transformer 207 dequantizes the transform coefficient 117 quantized with the internal transformer/quantizer 206, according to the quantization parameter set with the encoding controller 108, and subjects the dequantized transform coefficient to inverse-transform (inverse DCT, for example) and output the prediction error signal 116. The prediction error signal 116 decoded with the internal dequantizer/inverse transformer 207 is added to the predictive image signal 114 of the mode selected with the internal mode selector 204 with the internal adder 208. The addition signal is input to the internal reference image memory 209 as a decoded image signal 119.

The internal reference image memory 209 accumulates the decoded image signal 119 as a reference image. The reference image accumulated in the internal reference image memory 209 is referred to in the case of generating the prediction image signal 114 and the like with the pixel adaptive prediction unit 201, the directional prediction unit 202 or the fixed mode prediction unit 203. An internal prediction loop (a process performed in order of pixel adaptive prediction unit 201, directional prediction unit 202 or fixed mode prediction unit 203→internal mode selector 204→prediction change-over switch 205→internal transformer/quantizer 206→internal inverse→transformer/dequantizer 207→internal reference image memory 209 in FIG. 2) corresponds to one loop when the encoding process is performed for all prediction modes selectable in the pixel blocks of the macroblock.

When the pixel adaptive prediction, the directional prediction and the fixed mode prediction are switched in, for example, the 4×4-pixel prediction, the internal prediction loop is executed 16×3 times in total. In this case, the encoding controller 108 connects the prediction change-over switch 205 to the pixel adaptive prediction unit 201 first to execute the intra-prediction loop 16 times, and determine an optimum combination of the modes in units of macroblock in the pixel adaptive prediction.

The encoding controller 108 connects the prediction change-over switch 205 to the directional prediction unit 202 to execute the internal prediction loop 16 times. The encoding controller 108 connects the prediction change-over switch 205 to the fixed mode prediction unit 203 to determine which prediction method is used for performing the fixed mode prediction based on the state of the internal flag and perform prediction by the determined prediction method. Three modes obtained in this way are input to the mode selector 103 to select the optimum mode of the macroblock.

Similarly, in the case of the 8×8-pixel prediction, the internal prediction loop is executed 4×3 times. Since the 16×6-pixel prediction needs not generate a local decoded image, the internal prediction loop needs not be executed. Therefore, the mode and predictive image signal which are predicted with the pixel adaptive prediction unit 201 or the directional prediction unit 202 are output from the intra predictor 102 as-is. When the internal prediction loop is terminated for the macroblock, the input image signal 115 of the next macroblock is input to be encoded.

Figure 3:
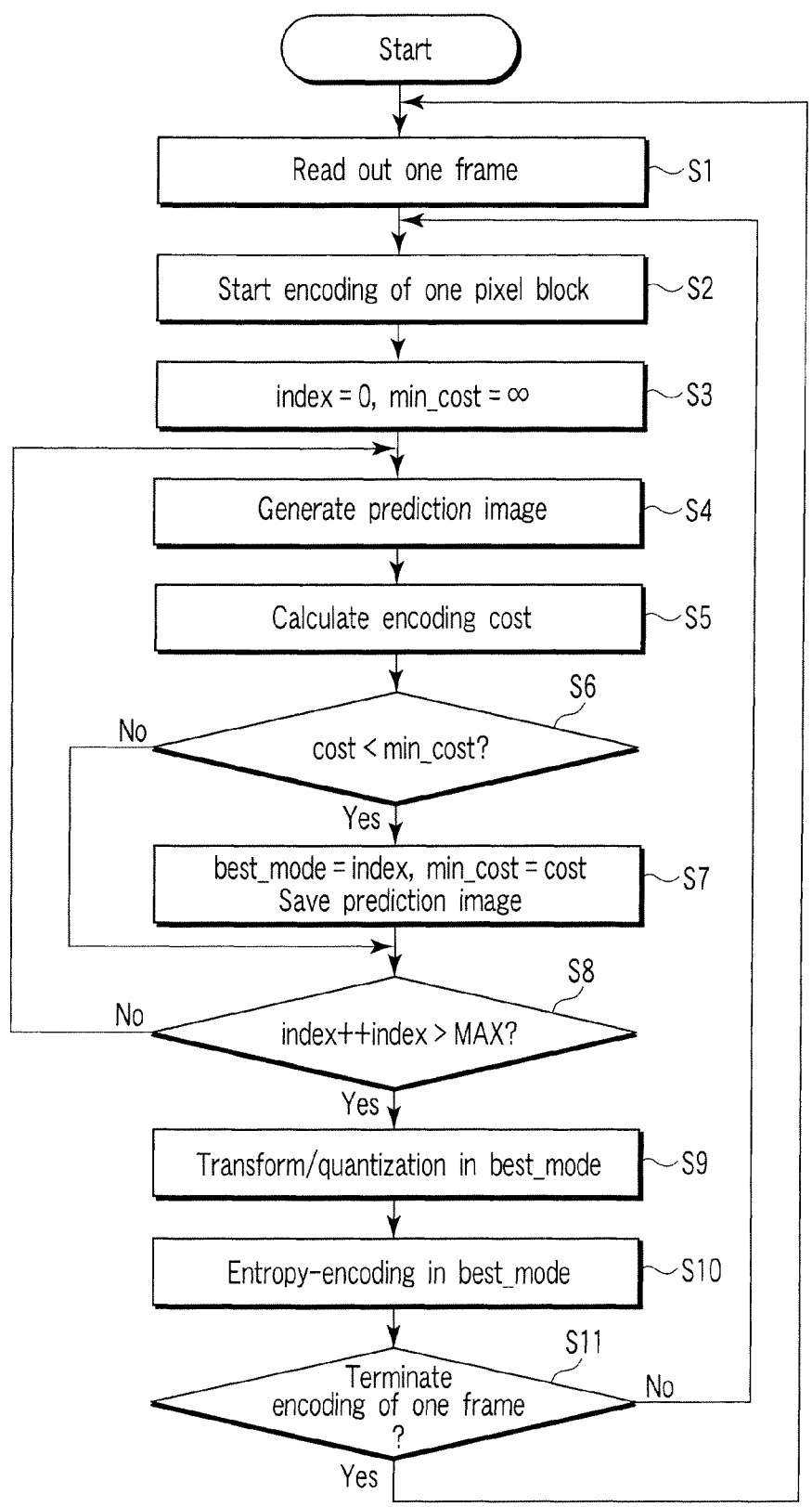
FIG. 3 is a flow chart of the video encoding apparatus according to the embodiment.

A video encoding method carried out with the video encoding apparatus 100 will be explained referring to FIG. 3.

When one frame of a video signal is input to the video encoding apparatus 100 (step S1), the image divider 101 divides one frame into a plurality of macroblocks and further divides them into a plurality of pixel blocks (step S2). One divided macroblock is input to the intra predictor 102 as the input image signal 115. Then, the mode selector 103 initializes an index indicating a mode and a cost (step S3).

The intra predictor 102 generates the predictive image signal 114 of the prediction mode selectable by the prediction block, using the input image signal 115 (step S4). The mode selector 103 calculates a difference between the predictive image signal 114 and the input image signal 115 to generate a prediction error signal 116. The cost is calculated from the absolute value sum SAD of the number of encoded bits OH and prediction error signal 116 of the prediction mode (step S5).

The mode selector 103 determines whether the calculated cost is smaller than the minimum cost min_cost (step S6). The mode selector 103 updates the minimum cost to the calculated cost and holds the selected encoding mode as a best_mode index when the calculated cost is smaller than the minimum cost (YES) (step S7). When the calculated cost is larger than the minimum cost min_cost (NO), the index indicating the mode number is incremented and it is determined whether the incremented index is the last mode (step S8).

When the index is larger than MAX indicating the number of the last mode (YES), the encoding mode information of best_mode and the prediction error signal 116 are sent to the transformer/quantizer 104 to be transformed and quantized (step S9). The quantized transform coefficient 117 is input to the encoding processor 107, and entropy-encoded along with the prediction information 109 and prediction switching information 110 with the encoding processor 107 (step S10). When the index is smaller than MAX indicating the number of the last mode (NO), the predictive image signal 114 of the encoding mode indicated by the next index is generated (step S4).

When the encoding is done in best_mode, the quantized transform coefficient 117 is input to the dequantizer/inverse transformer 105 and subjected to dequantization and inverse transform to be decoded to the prediction error signal 116. This decoded prediction error signal 116 is added to the predictive image signal 114 of best_mode provided from the mode selector 103 with the adder 118 to generate a decoded image signal 119. This decoded image signal 119 is stored in the reference image memory 106 as a reference image.

It is determined whether encoding for one frame is terminated (step S11). When the encoding process is completed (YES), the next frame is input to the video encoding apparatus 100 and the encoding process is done again. When the encoding process for one frame is not completed (NO), the input image signal of the next pixel block is input to the intra predictor 102 to continue the encoding process.

As described above, the video encoding apparatus 100 of this embodiment encodes the motion video.

In the pixel adaptive prediction of the embodiment, the prediction pixel is calculated using the weighted table of the filter shown in FIG. 7. In this case, the prediction pixel is predicted in order of increasing distance between the reference pixel and the prediction pixel, and the pixel value obtained by prediction is stored in a memory. This pixel value can be used as a reference pixel when the distance between the prediction image and the reference image increases. Therefore, the order of generating the prediction pixel may be determined in order of increasing distance between the reference pixel and the prediction pixel in the prediction direction. When the prediction pixel is generated from top down in the pixel adaptive vertical prediction (mode 0) in FIG. 6A, for example, the prediction pixel generated with L=1 at the time of the prediction of L=2 can be referred to. Similarly, in the pixel adaptation level prediction (mode 1), the prediction pixel is generated in a left-to-right direction. The generated prediction pixel is saved in the memory and is used as a reference pixel for the next prediction at any time. As a result, an arithmetic cost for calculating the prediction value of the prediction pixel of a long distance away from the reference pixel can be suppressed and a hardware cost can be reduced.

In this embodiment, the pixel adaptive intra prediction is explained for the 4×4-pixel prediction in detail. The similar prediction may be done for a 8×8-pixel block, a 16×16-pixel block and a color-difference signal.

Since the distance between the reference pixel and the prediction pixel increases with increase of a pixel block size, the pixel adaptive prediction provides a high effect. The number of reference pixels used for the prediction is increased according to the distance, but it may be reduced in order to reduce an arithmetic cost. There may be plural combinations of filters to use for prediction every prediction pixel.

In this embodiment, there is described the case that a to-be-processed frame is divided into a plurality of rectangular blocks each having a 16×16-pixel size, and the blocks are encoded in a sequence from upper-left to flower-right. However, the encoding sequence may be another sequence. The frame may be encoded from the lower-right to the upper-left, and also it may be encoded in a spiral shape from the center of the frame. The frame may be encoded from the upper-right to the lower-left, and it may be encoded toward the center from the periphery.

In this embodiment, there is described the case that the to-be-processed frame is divided into a plurality of macroblocks on a 16×16 block basis, and the intra prediction is based on a 8×8 pixel block or a 4×4 pixel block. However, the to-be-processed block needs not have a uniform block shape, and may have a block size such as 16×8 pixels, 8×16 pixels, 8×4 pixels, 4×8 pixels, etc. For example, 8×4-pixel prediction or 2×2-pixel prediction can be realized in the similar framework.

Figure 4E:
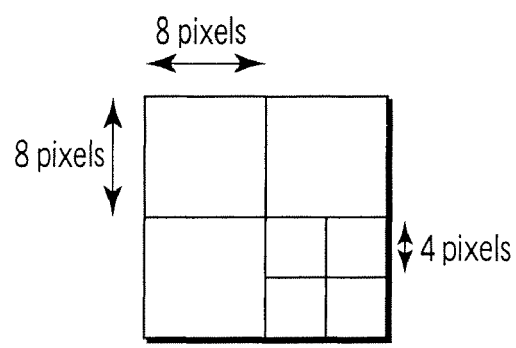

Also, the transform quantization block size needs not be a uniform block size, and may be a block size such as 16×8 pixels, 8×16 pixels, 8×4 pixels, 4×8 pixels. Further, it is not necessary to take a uniform block size in one macroblock. Different block sizes may be provided in the macroblock. For example, the 8×8-pixel prediction and the 4×4-pixel prediction may be coexisted in the macroblock as shown in FIG. 4E. In this case, the number of encoded bits necessary for encoding the divided blocks increases with increase of the number of divided blocks, but the intra prediction of higher prediction efficiency can be realized, and a prediction error can be reduced. Accordingly, the block size can be selected in consideration of balance between the number of encoded bits of transform coefficient and the local decoded image.

In this embodiment, the prediction mode is explained only in the intra prediction. However, inter prediction to do prediction using correlation between frames may be used. This prediction system may be used as intra prediction selected when encoding a slice in inter encoding. In this case, intra prediction and inter prediction needs not be switched in units of macroblock, and may be switched every 8×8-pixel block, and may be divided in units of a 8×4-pixel block.

In this embodiment, the transformer/quantizer 104 and the dequantizer/inverse transformer 105 are provided, but the transform/quantization and dequantization/inverse transform need not always be subjected to all prediction error signals. The prediction error signal may be encoded with the encoding processor 107 as it is, and the quantization/dequantization process may be omitted. Similarly, the transform/inverse transform process needs not to be done.

A method of encoding an ex_adaptive_intra_flag for switching between the pixel adaptive prediction and the directional prediction and an ex_direct_intra_flag for doing the fixed mode prediction will be described.

The structure of syntax used in this embodiment is shown schematically in FIG. 13. The syntaxes are made of mainly three parts, i.e., high level syntax (1301), slice level syntax (1304) and macroblock level syntax (1307). The high level syntax (1301) is filled with syntax information of higher layers than the slice. The slice level syntax (1304) is specified by information to be necessary for every slice. The macroblock level syntax (1307) is specified by a change value or mode information of the quantization parameter needed for every macroblock.

The syntax is composed of further detailed syntaxes. In other words, the high level syntax (1301) is composed of sequences such as sequence parameter set syntax (1302) and picture parameter set syntax (1303), and syntax of a picture level. The slice level syntax (1304) is composed of slice header syntax (1305) and a slice data syntax (1306). The macroblock level syntax (1307) is composed of macroblock layer syntax (1308) and macroblock prediction syntax (1309).

In this embodiment, necessary syntax information is the sequence parameter set syntax (1302), picture parameter set syntax (1303), slice header syntax (1305) and macroblock layer syntax (1308). The respective syntaxes will be explained hereinafter.

The ex_adaptive_intra_in_seq_flag shown in the sequence parameter set syntax of FIG. 14 is a flag indicating whether the pixel adaptive prediction is changed every sequence. When the flag is TRUE, the pixel adaptive prediction and the directional prediction can be switched in units of sequence. When the flag is FALSE, it is impossible to use the pixel adaptive prediction in the sequence.

The ex_adaptive_intra_in_pic_flag shown in the picture parameter set syntax of FIG. 15 is a flag indicating whether the pixel adaptive prediction is changed every picture. When the flag is TRUE, the pixel adaptive prediction and the directional prediction can be switched in units of picture. When the flag is FALSE, it is impossible to use the pixel adaptive prediction in the picture.

The ex_adaptive_intra_in_slice_flag shown in the slice header syntax of FIG. 16 is a flag indicating whether the pixel adaptive prediction is changed every slice. When the flag is TRUE, it is possible to switch between the pixel adaptive prediction and the directional prediction in units of slice. When the flag is FALSE, it is impossible to use the pixel adaptive prediction in the slice.

The ex_adaptive_intra_flag shown in the macroblock layer syntax of FIG. 17 is a flag indicating whether the pixel adaptive prediction is used in the macroblock. When the flag is TRUE, the pixel adaptive prediction is used. When the flag is FALSE, the directional prediction is used. This flag is effective when at least one of the ex_adaptive_intra_in_seq_flag, the ex_adaptive_intra_in_pic_flag and the ex_adaptive_intra_in_slice_flag are TRUE. The prediction type of macroblock can be used only in the intra prediction.

The ex_direct_intra_in_seq_flag shown in the sequence parameter set syntax of FIG. 18 is a flag indicating whether the fixed mode prediction is changed every sequence. When the flag is TRUE, it is possible to switch between use and unuse of the fixed mode prediction in units of sequence. When the flag is FALSE, it is impossible to use the fixed mode prediction in the sequence.

The ex_direct_intra_in_pic_flag shown in the picture parameter set syntax of FIG. 19 is a flag indicating whether the fixed mode prediction is changed every picture. When the flag is TRUE, it is possible to switch use and unuse of the fixed mode prediction in units of picture. When the flag is FALSE, it is impossible to use the fixed mode prediction in the picture.

The ex_direct_intra_in_slice_flag shown in the slice header syntax of FIG. 20 is a flag indicating whether the fixed mode prediction is changed every slice. When the flag is TRUE, it is possible to switch between use and unuse of the fixed mode prediction in units of slice. When the flag is FALSE, it is impossible to use the fixed mode prediction in the slice.

The ex_direct_intra_flag shown in the macroblock layer syntax of FIG. 21A is a flag indicating whether the fixed mode prediction is used in the macroblock. When the flag is TRUE, the fixed mode prediction is used. When the flag is FALSE, the fixed mode prediction cannot be used. This flag is effective only when at least one of the ex_direct_intra_in_seq_flag, the ex_direct_intra_in_pic_flag and the ex_direct_intra_in_slice_flag is TRUE. The prediction type of macroblock can be used only in the intra prediction.

FIG. 21B shows a macroblock prediction syntax. Prediction mode information in the corresponding macroblock is stored in this syntax. When a prediction mode aside from a fixed mode prediction is selected, this syntax sets the corresponding prediction mode information. prev_intra4×4_pred_mode_flag shown in this syntax is not used when ex_direct_intra_flag is TRUE.

prev_intra4×4_pred_mode_flag is a flag indicating whether the prediction mode (current_mode) estimated by adjacent prediction blocks coincides with a prediction mode (pred_mode) actually selected for the prediction intended block. When they coincide with each other, that is, it is TRUE, rem_intra4×4_pred_mode is not used. When they do not coincide with each other, rem_intra4×4_pred_mode is used further. rem_intra4×4_pred_mode represents a mismatch quantity between current_mode and a prediction mode (pred_mode) actually selected for the prediction intended block. When pred_mode is bigger than current_mode, a value of rem_intra4×4_pred_mode=current_mode is stored. when pred_mode is equal to or smaller than current_mode, a value of rem_intra4×4_pred_mode=current_mode+1 is stored. When both of the ex_direct_intra_flag and ex_adaptive intra_flag are TRUE, an encoding mode is used which does not send mode information in the pixel adaptive prediction. When the ex_direct_intra_flag is TRUE and the ex_adaptive_intra_flag is FALSE, an encoding mode is used which does not send mode information in the directional prediction.

The present embodiment improves the prediction precision of the prediction pixel away from the reference pixel, and reduces the prediction error.

Second Embodiment

Encoding

Figure 10:
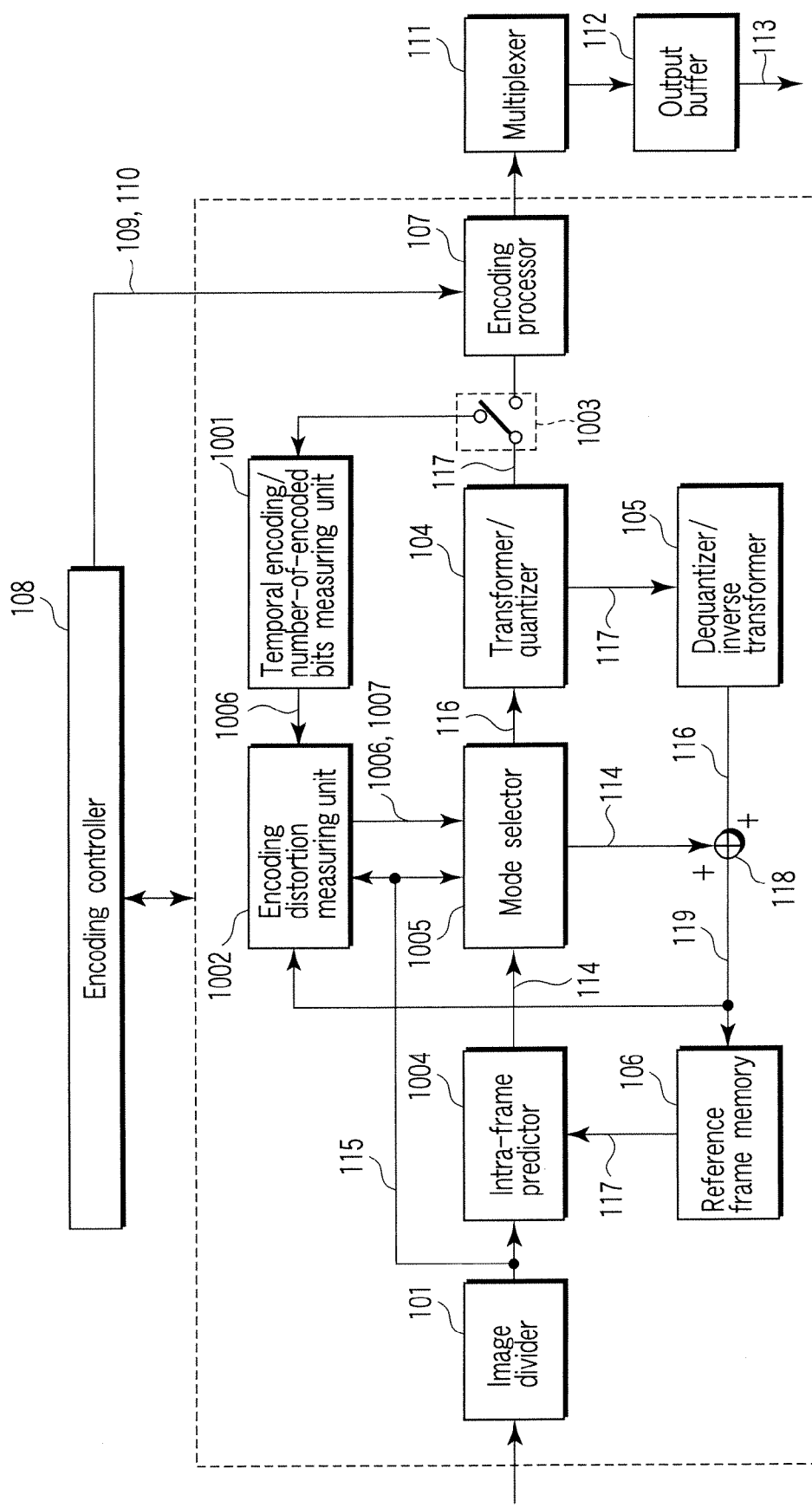
FIG. 10 is a block diagram of a video encoding apparatus according to a second embodiment.

In a video encoding apparatus 1000 according to the second embodiment shown in FIG. 10, a temporary encoding/number-of-encoded bits counter 1001, an encoding distortion measuring unit 1002, an encoding change-over switch 1003 are added to the video encoding apparatus of the first embodiment. Since the intra predictor and the mode selector differ in function from the first embodiment, reference numerals different from those of the first embodiment are assigned to them.

In the present embodiment, like reference numerals are used to designate like structural elements corresponding to those like in FIG. 1 and any further explanation is omitted for brevity's sake.

The video signal input to the video encoding apparatus 1000 is divided into a plurality of pixel blocks with the frame divider 101. Each block is input to the intra predictor 1004 as an input image signal 115. The intra predictor 1004 generates a predictive image signal 114 with all prediction modes selectable in the macroblock using the reference image stored temporarily in the reference image memory 106. However, when a next prediction cannot be done unless a local decoded image is generated in the macroblock like the intra prediction of H.264 (4×4-pixel prediction (FIG. 4C) or 8×8-pixel prediction (FIG. 4D)), the intra predictor 1004 may perform transform and quantization, and dequantization and inverse transform.

The predictive image signal 114 generated with the intra predictor 1004 is sent to the mode selector 1005. The mode selector 1005 generates a prediction error signal 116 obtained by subtracting the predictive image signal 114 from the input image signal 115. The mode selector 1005 receives the number of encoded bits 1006 accumulated with the temporal encoding/number-of-encoded bits measuring unit 1001 and the encoding distortion 1007 calculated with the encoding distortion measuring unit 1002 and calculate an encoding cost. The encoding cost is calculated by the following equation (24).

$$J = D + \lambda \times R \quad (24)$$

where R indicates the number of encoded bits, D is encoding distortion, and λ is a constant and determined by a quantization scale and a value of a quantization parameter. A mode is selected by the encoding cost obtained in this way. The mode providing a cost J whose value is minimum is selected as an optimum mode.

In this embodiment, the number of encoded bits 1006 and encoding distortion 1007 are used. However, the mode may be selected using only the number of encoded bits or only the encoding distortion. The cost may be calculated using the activity of the input image signal 115, and a cost function may be calculated using a quantization scale and a quantization parameter. The encoding distortion weighted by visual frequency characteristic or sensitivity, etc. is used as the encoding cost.

The mode selector 1005 is connected to the transformer/quantizer 104. The mode information and prediction error signal 116 which are selected with the mode selector 1005 are input to the transformer/quantizer 104. Transformer/quantizer 104 outputs a quantized transform coefficient 117 by subjecting the prediction error signal 116 to transform and quantization.

The transform coefficient 117 is sent to the temporary encoding change-over switch 1003. When a temporary encoding flag is set to TRUE with the encoding controller 108, the temporal encoding change-over switch 1003 connects the output of the transformer/quantizer 104 to the temporal encoding/number-of-encoded bits measuring unit 1001. The transform coefficient 117 is input to the temporal encoding/number-of-encoded bits measuring unit 1001 and temporally entropy-encoded. In this case, the temporal encoding/number-of-encoded bits measuring unit 1001 accumulates the number of encoded bits, and calculates an estimate of the total number of encoded bits due to actual encoding, but outputs encoded data. The number of encoded bits 1006 counted with the temporal encoding/number-of-encoded bits measuring unit 1001 is sent to encoding distortion measuring unit 1002.

The encoding distortion measuring unit 1002 not only receives a decoded image signal 119 generated by the sum of the prediction error signal 116 decoded with the dequantizer/inverse transformer 105 and the predictive image signal 114 as an input signal, but also receives an input image signal 115 and calculates a square error (encoding distortion 1007) of the decoded image signal 119 and the input image signal 115. The encoding distortion measuring unit 1002 sends the number of encoded bits 1006 as an input and the encoding distortion 1007 provided by calculation to the mode determination unit 1005.

A temporal encoding loop (a process performed in order of intra predictor 1004→mode selector 1005→transformer/quantizer 104→temporal encoding change over switch 1003→temporal encoding/number-of-encoded bits measuring unit 1001→encoding distortion measuring unit 1002 in FIG. 10) corresponds to one loop when the encoding process is performed for one prediction mode selectable for the macroblock. When there are ten kinds of modes, the temporary encoding loop is repeated ten times. When the temporal encoding loop is terminated for all modes selectable in the macroblock, the mode selector 1005 sets a provisional encoding flag of the encoding controller 108 to FALSE.

When the temporary encoding flag is set to FALSE with the encoding controller 108, the temporal encoding change-over switch 1003 connects the output of the transformer/quantizer 104 to the encoding processor 107. In this time, the mode determination unit 1005 calculates encoding costs for all modes, and sends the transform coefficient 117 and mode information of one mode of the modes which gives the minimum encoding cost to the encoding processor 107. The encoding processor 107 encodes actually the quantized transform coefficient 117 according to a method prescribed by input mode information. In this case, the data to be finally encoded is already encoded in temporal encoding once.

Therefore, the transform coefficient and mode information of the mode that the encoding cost is preferable at the time of the temporal encoding are saved in the memory, the encoding processor 107 may do the process of reading the coded data saved in the memory and copying it without encoding.

When the encoding loop is completed for the object macroblock, the input image signal 115 of the next block is input to the intra predictor 1004 to encode the next block. The encoding controller 108 performs feedback control of the number of encoded bits, quantization characteristic control, modal control, etc. and carries out rate control for controlling the number of encoded bits, control of the predictor and control of the entire encoding. The function of each part can be realized by a program stored by a computer.

The video encoding method according to the present embodiment will be explained referring to the intra predictor 1004 shown in FIG. 11. In the present embodiment, like reference numerals are used to designate like structural elements corresponding to those like in FIG. 2 and any further explanation is omitted for brevity's sake.

When the input image signal 115 is input to the intra predictor 1004, the signal is input to the pixel adaptive prediction unit 201, the directional prediction unit 202 and the fixed mode predictor 203. The predictive image signal 114 corresponding to the prediction mode and the prediction block shape is generated with each of the pixel adaptive prediction unit 201, the directional prediction unit 202 and the fixed mode predictor 203.

The predictive image signals 114 and the prediction mode information which are predicted with the predictors 201, 202 and 203 respectively are input to the internal mode selector 1104. The internal mode selector 1104 generates a prediction error signal 116 by subtracting the predictive image signal 114 from the input image signal 115. The internal mode selector 1104 calculates an internal encoding cost based on the number of encoded bits 1105 calculated with the internal temporal encoding/number-of-encoded bits counter 1101 and the internal encoding distortion calculated with the internal encoding distortion measuring unit 1102 by the equation (24), and selects the mode giving the encoding cost J of the minimum value as an optimum mode.

In this embodiment, the internal number of encoded bits 1105 and the internal encoding distortion 1006 are used for determining the mode. However, only the number of encoded bits or only the encoding distortion is used for determining the mode. The cost may be calculated using the activity of the input image signal, and a cost function may be calculated using a quantization scale and a quantization parameter. The encoding distortion weighted by visual frequency characteristic or sensitivity, etc. is used as the encoding cost.

The internal mode selector 1104 transmits to the encoding controller 108 the mode information indicating whether the selected mode is a mode predicted with the pixel adaptive prediction unit 201, a mode predicted with the directional prediction unit 202 or a mode predicted with fixed mode predictor 203. The encoding controller 108 controls the prediction change-over switch 205 according to given mode information.

The mode information and prediction error signal which are selected with the internal mode selector 1104 are input to the internal transformer/quantizer 206. The transformer/quantizer 206 orthogonal-transforms the input prediction error signal 116 to generate transform coefficient data 117. The transformer/quantizer 206 quantizes the transform coefficient. The quantization parameter needed for quantization is set with the encoding controller 108.

The encoding controller 108 refers to the temporary encoding flag and connects the internal temporal encoding change-over switch 1103 to the internal temporal encoding/number-of-encoded bits measuring unit 1101, resulting in supplying the transform coefficient and mode information of the mode to the internal temporal encoding/number-of-encoded bits measuring unit 1101. The internal temporal encoding/number-of-encoded bits measuring unit 1101 entropy-encoded these input data. In this case, the internal temporal encoding/number-of-encoded bits measuring unit 1101 accumulates the number of encoded bits, and calculates an estimate of the total number of encoded bits due to actual encoding, but does not output encoded data. The number of internal encoded bits 1105 measured with the internal temporal encoding/number-of-encoded bits measuring unit 1101 is sent to the internal encoding distortion measuring unit 1102.

The internal encoding distortion measuring unit 1102 not only receives a decoded image signal 119 generated by adding the prediction error signal 116 decoded with the internal dequantizer/inverse transformer 207 and the predictive image signal 114 as an input signal, but also receives an input image signal 115 and calculates a square error (internal encoding distortion 1106) of the decoded image signal 119 and the input image signal 115. The internal encoding distortion measuring unit 1102 sends the number of internal encoded bits 1105 receiving as an input and the internal encoding distortion 1106 provided by calculation to the internal mode determination unit 1104.

An internal temporal encoding loop (a process performed in order of respective prediction units→internal mode selector 1104→prediction change over switch 205→internal transformer/quantizer 206→internal temporal encoding change over switch 1103→internal temporal encoding/number-of-encoded bits measuring unit 1101→internal encoding distortion measuring unit 1102 in FIG. 10) corresponds to one loop when the encoding process is performed for one prediction mode selectable for the macroblock. When there are ten kinds of modes, the internal temporary encoding loop is repeated ten times. When the internal temporary encoding loop is terminated for all modes capable of being selected for the pixel block, the internal mode selector 1104 sets the temporal encoding flag of the encoding controller 108 to FALSE.

When, for example, 4×4-pixel prediction is done, the pixel adaptive prediction, directional prediction and fixed mode prediction are performed on one 4×4-pixel block. In this case, the temporal encoding loop is repeated 9+9+1 times. The above predictions are done for 16 blocks in the 4×4-pixel prediction, the internal temporal encoding loop is repeated 16×(9+9+1) times.

When a temporary encoding flag is set to FALSE with the encoding controller 108, the internal temporal encoding change-over switch 1103 connects the output of the internal transformer/quantizer 206 to the outside of the intra predictor 1004. In this time, the internal mode determination unit 1104 calculates encoding costs for all modes and sends to the outside of the intra predictor 1004 the transform coefficient 117 and mode information of one of the modes which gives the minimum encoding cost.

The video encoding method implemented by the video encoding apparatus 1000 will be explained referring to FIG. 12.

When a moving video is input to the video encoding apparatus 1000 (step S001), the image divider 101 divides one frame of the moving video into a plurality of macroblocks. One divided macroblock is input to the intra predictor 102 as an input image signal 115 (step S002). In this time, the mode selector 1005 and the internal mode selector 1104 initialize an index indicating a mode and a cost (step S003).

The intra predictor 1004 generates the predictive image signal 114 for a mode selectable for a prediction block using the input image signal 115 (step S004). The mode selector 1005 calculates an error between the predictive image signal 114 and the input image signal 115 to generate a prediction error signal 116. The transformer/quantizer 104 transforms and quantizes the prediction error signal 116 and inputs the quantized transform coefficient 117 to the temporary encoding/number-of-encoded bits measuring unit 1001. The temporal encoding/number-of-encoded bits measuring unit 1001 temporally encodes the transform coefficient (step S005) and accumulates the number of encoded bits. The transform coefficient is subjected to local decoding, and a square error of the input image signal and the decoded image signal is calculated with the encoding distortion measuring unit 1002. An encoding cost is calculated based on the number of encoded bits R and the encoding distortion D (step S006).

The mode selector 1005 determines whether the calculated encoding cost is smaller than the minimum encoding cost min_cost (step S007). When it is smaller (YES), the mode selector 1005 updates the minimum encoding cost to the encoding cost, holds an encoding mode corresponding to the calculated encoding cost as a best_mode index, and stores temporal coded data in a temporary storage (step S008). When the calculated encoding cost is larger than the minimum encoding cost min_cost (NO), the mode selector 1005 increments the index indicating a mode number, and determines whether the incremented index indicates the last mode (step S009).

When the index is larger than MAX indicating the number of the last mode (YES), the index is entropy-encoded together with the encoding mode information best_mode, the prediction information 109 and the prediction reshuffling information 110 with the encoding processor 107 (step S010). When the index is smaller than MAX indicating the number of the last mode (i.e., determination is NO), the predictive image signal 115 of the encoding mode indicated by the next index is generated (step S004).

When the encoding is done in best_mode, the quantized transform coefficient 117 is input to the dequantizer/inverse transformer 105 to be dequantized and inverse-transformed. The decoded prediction error signal 116 is added to the predictive image signal 114 of best_mode provided from the mode selector 1004 with the adder 118, and is saved in the reference image memory 106 as a decoded image signal 119.

Then, it is determined whether encoding of one frame is completed (step S11). When the encoding is completed (YES), an input image signal of a next frame is input to the frame divider 101 and the encoding process for the next frame is done. When the encoding process of one frame is not completed (NO), an input signal of a next macroblock is input to the intra predictor 1004 and the encoding process is continued.

The video encoding method of this embodiment is executed with the video encoding apparatus 1000 as described above. According to the present embodiment, the number of encoded bits can be allocated adequately to each block by utilization of temporal encoding and an index, whereby the coding efficiency is improved.

Third Embodiment

Encoding

In the third embodiment shown in FIG. 22, a first intra predictor 2202 and a second intra predictor 2203 are added to the second embodiment. Since the frame divider 2201 differ in function from the second embodiment, reference numerals different from those of the second embodiment are assigned to them. In the embodiment of FIG. 10, like reference numerals are used to designate like structural elements corresponding to those like in the embodiment of FIG. 1 and any further explanation is omitted for brevity's sake.

Figure 11:
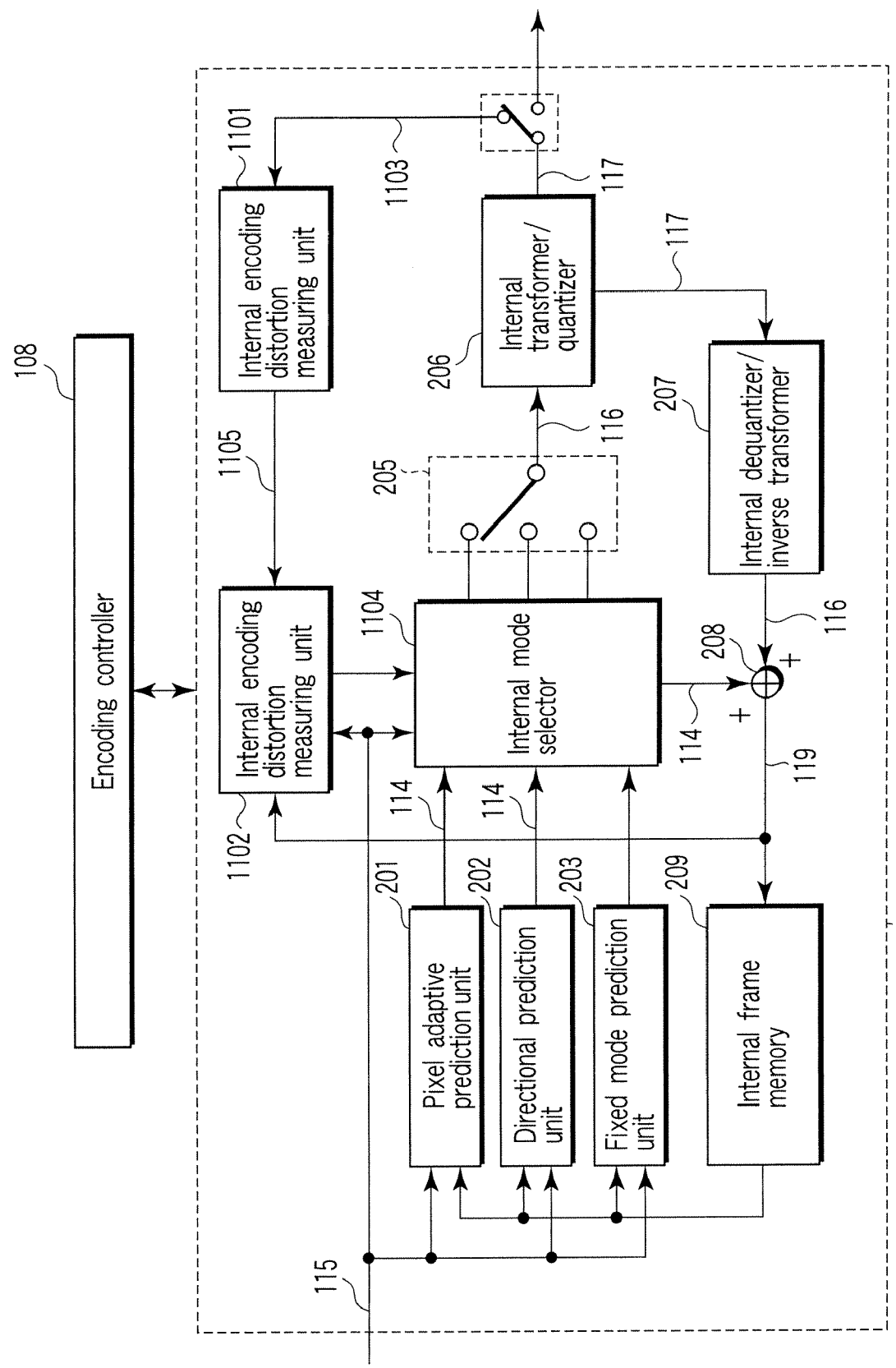
FIG. 11 is a block diagram of the intra predictor according to the embodiment.

In the video encoding apparatus 2200 shown in FIG. 22, the first intra predictor 2202 differs from the first intra predictor 2203 only in a prediction block size, and the prediction method is same as the intra predictor 1004 shown in FIG. 11. An image divider 2201 divides an input video signal into a plurality of pixel blocks. At this time, the macroblock is divided in different block shapes. One macroblock is divided into 16 4×4-pixel blocks, and the other macroblock is divided into four 8×8 pixel-blocks. The respective divided blocks are input to the first intra predictor 2202 and the second intra predictor 2203 as the input image signal 115. The first intra predictor 2202 performs 4×4-pixel prediction. Four predictive images each configured by a 8×8-pixel block composed of four 4×4-pixel blocks which are gathered are created. The second intra predictor 2203 performs 8×8-pixel prediction. In other words, the second intra predictor 2203 performs the 8×8-pixel prediction four times. At a point of time when the prediction for the first 8×8-pixel block is completed, a predictive image signal based on the 4×4-pixel prediction and a predictive image signal based on the 8×8-pixel prediction are input to the mode selector 1005. The mode selector 1005 calculates encoding costs according to a given system, and selects from the calculated encoding costs a prediction mode denoting the minimum encoding cost. The decoded image corresponding to the selected mode is accumulated in the reference image memory 106 through the transformer/quantizer 104 and the dequantizer/inverse transformer 105.

When the mode of the first 8×8-pixel block is determined, the prediction of the next 8×8 pixel block is done similarly. In other words, the 4×4-pixel prediction and the 8×8-pixel prediction can be switched in units of 8×8 pixels in the macroblock. FIG. 4E shows an example to change the prediction block size in the macroblock. When all the modes of four 8×8-pixel blocks are determined, the encoding controller 108 connects the temporal encoding change-over switch 1003 to the encoding processor 107 to perform encoding. At this time, the information indicating whether the 8×8 pixel block is encoded by the 4×4-pixel prediction or the 8×8-pixel prediction is encoded at the same time. This information is encoded as data of 4 bits on the macroblock with the encoding processor 107.

There will be explained a syntax of block size change information necessary for changing prediction information hereinafter.

The ex_adaptive_blocksize_in_seq_flag shown in the sequence parameter set syntax of FIG. 23 is a flag indicating whether a block size change prediction is changed every sequence. When the flag is TRUE, it is possible to switch between use and unuse of the block size change over prediction in units of sequence. When the flag is FALSE, it is impossible to use the block size change over prediction in the sequence.

The ex_adaptive_blocksize_in_pic_flag shown in the picture parameter set syntax of FIG. 24 is a flag indicating whether the block size change prediction is changed every picture. When the flag is TRUE, it is possible to switch between use and unuse of the block size change over prediction in units of picture. When the flag is FALSE, it is impossible to use the block size change over prediction in the picture.

The ex_adaptive_blocksize_in_slice_flag shown in the slice header syntax of FIG. 25 is a flag indicating whether a block size change over prediction is changed every slice. When the flag is TRUE, it is possible to switch between use and unuse of the block size change over prediction in units of slice. When the flag is FALSE, it is impossible to use the block size change over prediction in the slice.

The ex_adaptive_blocksize_mode shown in the macroblock layer syntax of FIG. 26 is data of 4 bits, and corresponds to the block size change over information. FIG. 28A shows whether the 8×8-pixel block is the 4×4-pixel prediction or the 8×8-pixel prediction, in the order corresponding to A, B, C and D. When, for example, the ex_adaptive_blocksize_mode shows 1100, it is seen that the blocks A and B are encoded by the 8×8-pixel prediction, and the blocks C and D are encoded by the 4×4-pixel prediction as shown in FIG. 28B. This data is effective when at least one of the ex_adaptive blocksize_in_seq_flag, the ex_adaptive_blocksize_in_pic_flag, and the ex_adaptive_blocksize_in_slice_flag is TRUE.

The syntax is not sent by a macroblock layer but may be sent by a macroblock type. FIG. 27 shows an example for giving block size change over information to a macroblock type. When mb_type is 0, the macroblock is predicted only by the 4×4-pixel prediction. When mb_type is 1, the macroblock is predicted only by the 8×8-pixel prediction. When mb_type represents 1 to 5, block size change over prediction is performed. Intra_A_B_C_D shows which block is used by the 8×8-pixel prediction. The positions of blocks A, B, C and D are shown in FIG. 28A. When mb_type is, for example, 3, it is shown that the blocks A and B are predicted by the 8×8-pixel prediction. When mb_type is 6, it is shown that the 16×16-pixel prediction is done. The prediction of good efficiency can be attained by giving block size change over information to mb_type and a small index to a mode of high selection frequency in this way.

As discussed above, this embodiment performs actually a temporal encoding process in each of a plurality of selectable encoding modes in units of 8×8 pixels, selects a mode corresponding to the minimum one of encoding costs calculated from the number of encoded bits of the encoded data based on the mode every 8×8-pixel block and an encoding distortion thereof, and outputs encoded data based on the selected mode. In this way, because mode selection is done by changing the prediction block size every 8×8-pixel block in the macroblock, a block shape allowing encoding of high coding efficiency can be selected according to the prediction method. In other words, preferred encoding can be done according to contents of the pixel block, etc.

In this way, since encoding having a large load needs not be done for all of respective modes, and the encoding in the selected mode has only to be done, increase of an operation load can be suppressed. In other words, this embodiment allows selection of preferable mode at high speed and video encoding with high speed and high compression efficiency to realize.

As mentioned above, in the case of encoding the pixel block in a selected mode, a decoded video signal has only to be generated only in the selected mode. The encoding needs not to be always executed in a loop for determining a prediction mode.

The video decoding apparatus corresponding to the video encoding apparatus will be explained.

Fourth Embodiment

Decoding

According to the video decoding apparatus shown in FIG. 29, the encoded data transmitted from the video encoding apparatus and sent through a transmission system or an recording medium system is saved in an input buffer 901 once. The encoded data is divided into a plurality of pixel blocks according to syntax every frame with a demultiplexer 902 and then input them to a code string decoder 903. The code string decoder 903 decodes the code string of each syntax of the coded data for each of a high level syntax, a slice level syntax and a macroblock level syntax according to the syntax structure shown in FIG. 13. As a result, a quantized transform coefficient, a quantization matrix, a quantization parameter, prediction mode information, prediction change information are reconstructed.

The quantized transform coefficient is dequantized using the quantization matrix and quantization parameter of the reconstructed information with the dequantizer/inverse transformer 904, and subjected to inverse orthogonal transform (for example, inverse discrete cosine transform). The inverse orthogonal transform is explained here. However, when the wavelet transform is done with the encoder, the dequantizer/inverse transformer 904 may execute inverse quantization and inverse wavelet transform corresponding to the inverse orthogonal transform. The coefficient transformed with the dequantizer/inverse transformer 904 is sent to an adder 905 as an error signal 911. The adder 905 adds the predictive signal 916 output from the intra predictor 907 and the error signal 911, and inputs an addition signal to a reference image memory 906 as a decoded signal 912. The decoded signal 912 is sent to an output buffer 913 and output at timing controlled with the decoding controller 908.

The prediction mode information 909 and the prediction change information 910 decoded with the code string decoder 903 are input to an intra predictor 907. The already encoded reference signal 914 is read from the reference image memory 906 to the intra predictor 907. The intra predictor 907 generates a predictive signal 916 based on input information and inputs it to the adder 905. The decoding controller 908 controls the input buffer 901 and the output buffer 913 or decoding timing, etc.

The intra predictor 907 of the video decoding apparatus 900 implementing the video decoding method according to the present embodiment will be explained referring to FIG. 30. In the embodiment of FIG. 30, like reference numerals are used to designate like structural elements corresponding to those like in the embodiment of FIG. 29 and any further explanation is omitted for brevity's sake.

When prediction mode information 909 and prediction switching information 910 which are decoded with the code string decoder 903 are input to the intra predictor 907, these information are sent to a prediction controller 3007 once. A prediction change-over switch 3001 is controlled according to the prediction switching information 910. More specifically, the ex_adaptive_intra_flag and ex_direct_intra_flag are input to prediction controller 3007 as prediction switching information. The ex_adaptive_intra_flag is a flag indicating whether the image is predicted by the pixel adaptive prediction or the directional prediction. If the flag is TRUE, the prediction change-over switch 3001 is connected to the pixel adaptive prediction unit 3002. If the flag is FALSE, the prediction change-over switch 3001 is connected to the directional prediction unit 3003. The ex_direct_intra_flag is a flag indicating whether or not the fixed mode prediction is done. If the flag is TRUE, the prediction change-over switch 3001 is connected to the fixed mode predictor regardless of the state of ex_adaptive_intra_flag. When the prediction change-over switch 3001 is switched according to respective information, the reference signal 914 is input to the intra predictor 907.

The reference signal 914 is input to the prediction unit corresponding to the flag through the prediction change-over switch 3001. When the reference signal 914 is input to the pixel adaptive prediction unit 3002, the prediction controller 3007 inputs prediction mode information 909 to the pixel adaptive prediction unit 3002. Based on this information the pixel adaptive prediction unit 3002 performs the pixel adaptive prediction and generates the predictive signal 916. When the reference signal 914 is input to the directional prediction unit 3003, the prediction controller 3007 inputs prediction mode information 909 to the directional prediction unit 3003. Based on this information the directional prediction unit 3003 performs directional prediction and generates the predictive signal 916. When the reference signal 914 is input to the fixed mode predictor 3004, the prediction controller 3007 inputs prediction mode information 909 to the fixed mode prediction unit 3004. Based on this information the fixed mode prediction unit 3003 performs fixed mode prediction and generates the predictive signal 916. The predictive signal 916 predicted selectively by the prediction units 3002, 3003 and 3004 in this way is output outside the intra predictor 907.

Subsequently, there will be explained a prediction method of each of the prediction units 3002, 3003 and 3004. These prediction units each predict a to-be-predicted block using the already decoded reference signal 914 stored in the reference image memory 906. There are nine prediction modes having prediction directions different from one another by every 22.5 degrees as shown in FIG. 5A. The modes are prescribed from mode 0 to mode 8, and mode 2 is a DC prediction in the directional prediction unit 3003. The names of the directional prediction mode done with the directional prediction unit 3003 and pixel adaptive prediction mode done with the pixel adaptive prediction unit 3002 are shown in FIG. 9. The relation between the prediction block and reference pixel of the 4×4-pixel prediction is shown in FIG. 5B. The pixels of upper-case characters A to M are reference pixels, and the pixels of lower-case characters a to p are prediction pixels.

The prediction method of the directional prediction unit 3003 will be explained first. When the DC prediction of mode 2 is selected, the directional prediction unit 3003 calculates a prediction pixel using the equation (2). When a reference pixel cannot be used, the prediction is performed by the average of the available reference pixels. If there is no available reference pixel, the prediction value is calculated by a half value of the maximum luminance value of the encoding apparatus (128, if it is 8 bits). If another mode is selected, the directional prediction unit 3003 uses a prediction method for copying a prediction value interpolated by the reference pixels in the prediction direction shown in FIG. 5A. When, for example, the mode 0 (vertical prediction) is selected, the prediction value generation method uses the equation (3). This mode can be selected only when the reference pixels A to D can be used. In this prediction method, the brightness values of the reference pixels A to D are copied in a vertical direction as-is as shown in FIG. 5C and supplemented as prediction values.

The prediction methods aside from the prediction modes 0 and 2 use the framework approximately similar to the above, and perform prediction by generating the interpolation value from the reference pixels available in the prediction direction, and copying the value according to a prediction direction.

The pixel adaptive prediction unit 3002 will be explained. The prediction mode is identical to one described referred to FIG. 5A. The pixel adaptive prediction unit 3002 performs prediction while changing the number of available reference pixels according to the distance between the prediction pixel and the reference pixel, with the prediction value being changed in units of pixel. It is possible to generate a prediction value of higher precision by changing a weighted table for the using reference pixel according to the distance.

The relation between the reference pixel and the prediction block are shown in FIG. 6A. The reference pixel and prediction pixel shown in FIGS. 6A and 5B correspond one-to-one with each other. However, different indexes are given to these pixels to facilitate explanation of the prediction equation. There are thirteen reference pixels x00 to x08, x09, x18, x27 and x36. There are sixteen prediction pixels x10 to x13, x19 to x22, x28 to x31, and 37 to x40. The sixteen pixels X14×17, x23×26, x32×35, and x41 to x44 are prediction aid pixels, and used to raise prediction precision.

A prediction value generation method in the pixel adaptive vertical prediction (mode 0) will be explained in detail. The prediction method of pixel adaptive vertical prediction is shown in FIG. 6B. As can be seen from FIG. 6, the prediction value is determined using reference pixels increasing in number with increase of the distance between the reference pixel and the prediction pixel.

The prediction value generation method will be explained in concrete form. The pixel adaptive vertical prediction calculates the prediction pixel using the equation (5). n indicates an index corresponding to one of the prediction pixels (x10 to x13, x19 to x22, x28 to x31, x37 to x40) shown in FIG. 6A. d is given by the equation (6). Developing the equation (5) according to the distance between the reference pixel and the prediction pixel, a prediction equation such as the equation (7) is established. L represents the distance between the reference pixel and the prediction pixel. Vi is an index determined according to the corresponding prediction mode. In represents a filter coefficient and the number of taps changes according to L.

The prediction pixel away from the reference pixel by one pixel in the prediction direction is calculated by the equation (8) using three reference pixels. Where n indicates an index corresponding to L=1 (pixels x10 to x13). The filter coefficient is hi=(1, 2, 1), and corresponds to Vi=(d+1, d, d−1).

The prediction pixel away from the reference pixel by two pixels in the prediction direction is predicted by the equation (9) using five reference pixels. n indicates an index corresponding to L=2 (x19 to x22). The filter coefficient is hi=(1, 4, 6, 4, 1), and corresponds to Vi=(2d+2, 2d+1, 2d, 2d−1, 2d−2).

The prediction pixel away from the reference pixel by three pixels in the prediction direction is predicted by the equation (9) using seven reference pixels. n indicates an index corresponding to L=3 (x28 to x31). The filter coefficient is hi=(1, 6, 15, 20, 15, 6, 1), and corresponds to Vi=(3d+3, 3d+2, 3d+1, 3d, 3d−1, 3d−2, 3d−3).

The prediction pixel away from the reference pixel by four pixels in the prediction direction is predicted by the equation (10) using seven reference pixels. n indicates an index corresponding to L=4 (x37 to x40). The filter coefficient is hi=(1, 8, 28, 56, 70, 56, 28, 8, 1), and corresponds to Vi=(4d+4, 4d+3, 4d+2, 4d+1, 4d, 4d−1, 4d−2, 4d−3, 4d−4).

Prediction equations of respective modes will be explained. The pixel adaptive horizontal prediction (mode 1) performs prediction using the equation (14). The pixel adaptive upper left prediction (mode 2) performs prediction using the equation (15). The pixel adaptive orthogonal lower-left prediction (mode 3) performs prediction using the equation (16). The pixel adaptive orthogonal lower-right prediction (mode 4) performs prediction using the equation (17). The pixel adaptive left vertical prediction (mode 5) performs prediction using the equation (18). The pixel adaptive horizontally lower prediction (mode 6) performs prediction using the equation (19). The pixel adaptive left vertical prediction (mode 7) performs prediction using the equation (20). The pixel adaptive upper horizontal prediction (mode 8) performs prediction using the equation (21). In order for the predictive pixel value to be calculated, the necessary predicted image is put in the equation to develop it. As a result, necessary reference pixels, the number of the reference pixels, and a weighting table are determined.

When there is no reference pixel, the reference pixel is supplemented like the pixel adaptive vertical prediction. When the pixel x37 is predicted by the pixel adaptive horizontal prediction, the reference pixel x45 cannot be used. Therefore, this reference pixel is supplemented by the pixel x36.

As described above, the predictive image generation method is executed by the pixel adaptive prediction unit 3002.

The fixed mode prediction unit 3004 will be described in detail. The fixed mode prediction unit 3004 predicts mode information, and performs the pixel adaptive prediction or directional prediction in the determined prediction mode. The prediction of the mode information uses mode information of a prediction block adjacent to the prediction intended block.

The relation of the adjacent block and the prediction intended block in 4×4-pixel prediction is shown in FIG. 8. Assuming that the block adjacent to the left of the prediction intended block C is A and the block adjacent to the upper side thereof is B. When two these prediction modes are given as prev_left_mode and prev_upper_mode, the prediction mode of the block is determined by the equation (23). The current_mode indicates a prediction mode of the prediction intended block. A function min (A, B) represents a value of smaller one of the blocks A and B. In this way, since prediction mode information of the prediction intended block is predicted from prediction mode information of surrounding blocks, the encoding mode is one of encoding modes which the number of encoded bits necessary for encoding prediction mode information can be largely reduced.

It is determined by the ex_direct_intra flag whether the pixel adaptive prediction unit 201 or the directional prediction unit 202 is used to generate the predictive image. It is determined based on the ex_direct_intra flag given from the encoding controller 108.

In the present embodiment, the prediction mode information of the current prediction block is determined based on the prediction mode information of the adjacent prediction blocks A and B. As a modification of the present embodiment, it may be determined based on the prediction mode information of surrounding prediction blocks. The prediction mode of the current prediction block may be determined using prediction mode information of a block on the right side of the prediction block B, a block on the upper side of the prediction block B, a block on the left side of the prediction block A and a block on the upper side of the prediction block A. For example, the most frequent prediction mode among the prediction modes of the surrounding prediction blocks, the median value of the prediction modes of the surrounding prediction blocks or the average of the prediction modes of the surrounding prediction blocks may be determined as the prediction mode of the current prediction block.

A decoding method for decoding a syntax of prediction switching information for switching between the pixel adaptive prediction and directional prediction, an ex_adaptive_intra_flag, a syntax for predicting the fixed mode, and the ex_direct_intra_flag is the same as the encoding method shown in FIGS. 13 to 21.

Fifth Embodiment

Decoding

The decoding apparatus 3100 related to the second embodiment will be explained referring to FIG. 31. In this embodiment, the intra predictor 907 of the fourth embodiment is changed to the first intra predictor 3102 and the second intra predictor 3103. A block size change-over switch 3101 is introduced newly. In the present embodiment, like reference numerals are used to designate like structural elements corresponding to those like in the embodiment of FIG. 29 and any further explanation is omitted for brevity's sake.

The prediction mode information 909, prediction switching information 910 and block size switching information 915, which are decoded with the code string decoder 903 are sent to the block size change-over switch 3101 and the decoding controller 908. The decoding controller 908 connects the block size change-over switch 3101 to an appropriate contact based on the block size switching information.

More specifically, a block size is determined based on the ex_adaptive_blocksize_mode given from the code string decoder 903.

This information is composed of 4 bits, and indicates whether the 4×4-pixel prediction or the 8×8-pixel prediction is performed with 8×8 pixels in the macroblock. The bits are allocated sequentially from the upper left to the lower-right, and arranged in the order corresponding to A, B, C and D as shown in FIG. 28A. When the value of ex_adaptive_blocksize_mode is 1100, it is found that the 8×8-pixel prediction is allocated to the blocks A and B and the 4×4-pixel prediction is allocated to the blocks C and D as shown in FIG. 28B.

If a value of each bit is 0, the decoding controller 903 connects the first output terminal of the block size change-over switch 3101 to the intra predictor 3102. The first intra predictor 3102 performs the 4×4-pixel prediction on four 4×4 pixel blocks and sends a predictive image to the adder 905.

If the value of each bit corresponding to the 8×8 pixel block is 1, the decoding controller 908 connects the second output terminal of the block size change-over switch 3101 to the intra predictor 3103. The second intra predictor 3103 performs the 8×8-pixel prediction on the 8×8-pixel block and sends a predictive image to the adder 905.

The first intra predictor 3102 and the second intra predictor 3103 both are similar in internal structure to FIG. 30, and perform prediction of the determined block size based on the input prediction switching information and outputs a predictive signal.

The decoding controller 908 does control of a block size change-over switch as well as control of the input buffer 901 and output buffer 913 or control of decoding timing. The syntax of the block size change information required when the prediction information is changed in this embodiment is the same as that shown in FIGS. 24 to 26. The block size switching information is not obtained from the macroblock layer, but may be obtained from the macroblock type.

FIG. 27 shows an example for acquiring block size switching information from the macroblock type. When mb_type is 0, the macroblock is predicted only by the 4×4-pixel prediction. When mb_type is 1, the macroblock is predicted only by the 8×8-pixel prediction. When mb_type is 1 to 5, the macroblock size prediction is performed. Intra_A_B_C_D shows which block uses the 8×8-pixel prediction. The positions of the blocks A, B, C and D are shown in FIG. 28A.

According to the present embodiment, predictive image generation of high precision allows every block. When intra prediction is done, the prediction mode can be changed every sequence, every slice or every macroblock, so that the predictive image can be generation in consideration of subjective picture quality.

The video encoding is explained in the present embodiment, but the present invention can be applied to still image encoding.

According to the present invention, a prediction error is reduced in intra prediction while reducing hardware cost, the coding efficiency is improved, and the predictive image which visual property is considered enough can be generated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image decoding method comprising:
    decoding an input image signal to generate a decoded image signal including prediction mode information;
    changing the number of reference pixels for use in prediction and a procedure for prediction pixel generation according to a selected prediction mode based on the prediction mode information;
    generating a predictive image signal by extrapolating or interpolating using a distance between an reference pixel and a prediction pixel;
    generating a prediction error signal based on the decoded image signal; and
    generating a reconstructed image by adding the predictive image signal and the prediction error signal.

2. The method according to claim 1 further including changing in a specific pixel block size a size of the prediction pixel block corresponding to the prediction mode every prediction mode.

3. The method according to claim 1 further including predicting a prediction mode and switching between decoding and non-decoding of predicted prediction mode information in a specific pixel block size.

4. The method according to claim 1, wherein generating the predictive image signal includes changing a weighted table of a filter for use in prediction according to the distance between the reference pixel and the prediction pixel.

5. The method according to claim 1, wherein generating the predictive image signal includes dequantizing transform coefficient of the decoded image signal, and inverse-transforming the dequantized transform coefficient to generate the prediction error signal.

6. The method according to claim 1, wherein generating the predictive image signal includes switching adaptively between use and unuse of the predicted prediction image signal.

7. The method according to claim 1, wherein generating the predictive image signal includes switching adaptively between use and unuse of the decoded reference image.

8. The method according to claim 1, wherein generating the predictive image signal includes switching between execution and inexecution of intra prediction.

9. The method according to claim 1, further including switching between the prediction modes according to a value of a quantization parameter of the image block signal.

10. The method according to claim 1, further including switching between the prediction modes according to resolution of the input image signal.

11. The method according to claim 1, wherein the generating the prediction signal includes changing a procedure for prediction pixel generation according to a prediction direction prescribed by the prediction mode when performing extrapolation or interpolation in units of pixel, and saving temporally the encoded reference pixel and the extrapolated or interpolated prediction pixel in a memory to use for next prediction.

12. An image decoding apparatus comprising:
    a decoder to decode an input image signal to generate a decoded image signal including prediction mode information;
    a generator to generate a predictive image signal by changing the number of reference pixels for use in prediction and a procedure for prediction pixel generation according to a selected prediction mode based on the prediction mode information of the decoded image signal and a distance between an encoded reference pixel and a prediction pixel, and performing intra prediction for extrapolating or interpolating the decoded image signal in units of pixel;
    a generator to generate a prediction error signal based on the decoded image signal; and
    a generator generating a reconstructed image by adding the predictive image signal and the prediction error signal.

13. A computer-readable medium storing a program for decoding an encoded image, the program comprising:
    means for instructing a computer to decode an input image signal to generate a decoded image signal including prediction mode information;
    means for instructing the computer to change the number of reference pixels for use in prediction and a procedure for prediction pixel generation according to a selected prediction mode based on the prediction mode information of the decoded image signal and a distance between an reference pixel and a prediction pixel;
    means for instructing the computer to generate a predictive image signal by intra-picture prediction for extrapolating or interpolating the decoded image signal in units of pixel;
    means for instructing the computer to generate a prediction error signal based on the decoded image signal; and
    means for instructing the computer to generate a reconstructed image by adding the predictive image signal and the prediction error signal.

* * * * *